US012774246B2

(12) United States Patent
Gross et al.

(10) Patent No.: US 12,774,246 B2
(45) Date of Patent: Oct. 27, 2026

(54) METHOD OF STRENGTHENING GLASS AND SUCH GLASSES

(71) Applicant: CORNING INCORPORATED, Corning, NY (US)

(72) Inventors: Timothy Michael Gross, Painted Post, NY (US); Alexandra Lai Ching Kao Andrews Mitchell, Ithaca, NY (US); Jamie Vargeson, Painted Post, NY (US); Wendell Porter Weeks, Jr., Rochester, NY (US)

(73) Assignee: CORNING INCORPORATED, Corning, NY (US)

( * ) Notice: Subject to any disclaimer, the term of this patent is extended or adjusted under 35 U.S.C. 154(b) by 66 days.

(21) Appl. No.: 18/944,699

(22) Filed: Nov. 12, 2024

(65) Prior Publication Data

US 2025/0162932 A1 May 22, 2025

Related U.S. Application Data

(60) Provisional application No. 63/636,156, filed on Apr. 19, 2024, provisional application No. 63/600,790, filed on Nov. 20, 2023.

(51) Int. Cl.
*C03C 21/00* (2006.01)

(52) U.S. Cl.
CPC ........ *C03C 21/002* (2013.01); *C03C 2201/50* (2013.01); *Y10T 428/315* (2015.01)

(58) Field of Classification Search
None
See application file for complete search history.

(56) References Cited

U.S. PATENT DOCUMENTS

| | | | |
|---|---|---|---|
| 3,146,114 | A | 8/1964 | Kivlighn |
| 3,408,213 | A | 10/1968 | Kelley et al. |
| 3,455,706 | A | 7/1969 | Wada et al. |
| 3,506,423 | A | 4/1970 | Morris |

(Continued)

FOREIGN PATENT DOCUMENTS

| | | | |
|---|---|---|---|
| CN | 112079565 | A | 12/2020 |
| CN | 113845302 | A | 12/2021 |

(Continued)

OTHER PUBLICATIONS

Hrma, Pavel, High-Temperature Viscosity of Commercial Glasses, Ceramics—Silikáty 50 (2) 57-66 (2006) (Year: 2006).*

(Continued)

*Primary Examiner* — David Sample
(74) *Attorney, Agent, or Firm* — Russell S. Magaziner

(57) ABSTRACT

A method of manufacturing a strengthened glass article comprises soaking a glass article in a bath comprising molten salt. The molten salt comprises alkali metal ions. During the soaking, the alkali metal ions of the salt are exchanged for smaller alkali metal ions of glass of the glass article and impart a compressive stress in the glass article in an ion-exchanged portion thereof at or near a surface thereof. The glass of the glass article has a strain point temperature of at least 625° C., corresponding to glass viscosity of $10^{14.68}$ poise. The temperature of the bath is at least 70° C. below the strain point temperature of the glass of the glass article.

18 Claims, 8 Drawing Sheets

(56) References Cited

U.S. PATENT DOCUMENTS

| | | | |
|---|---|---|---|
| 3,524,737 A | 8/1970 | Doyle et al. | |
| 3,661,545 A | 5/1972 | Bartholomew | |
| 3,773,489 A | 11/1973 | Forker et al. | |
| 3,849,097 A | 11/1974 | Giffen et al. | |
| 4,376,835 A | 3/1983 | Schmitt et al. | |
| 4,726,981 A | 2/1988 | Pierson et al. | |
| 5,741,745 A | 4/1998 | Sehgal et al. | |
| 6,156,683 A | 12/2000 | Rasmussen et al. | |
| 6,532,770 B2 | 3/2003 | Uhlik et al. | |
| 7,087,541 B2 | 8/2006 | Kohli | |
| 7,638,447 B2 | 12/2009 | Bernard et al. | |
| 8,586,492 B2 | 11/2013 | Barefoot et al. | |
| 8,647,995 B2 | 2/2014 | Aitken et al. | |
| 8,759,238 B2 | 6/2014 | Chapman et al. | |
| 8,765,262 B2 | 7/2014 | Gross | |
| 8,854,623 B2 | 10/2014 | Fontaine et al. | |
| 9,701,580 B2 | 7/2017 | Smedskjaer et al. | |
| 9,815,733 B2 | 11/2017 | Dejneka et al. | |
| 11,447,417 B2 | 9/2022 | Li et al. | |
| 11,472,730 B2 | 10/2022 | Boek et al. | |
| 2004/0221615 A1 | 11/2004 | Postupack et al. | |
| 2012/0135226 A1* | 5/2012 | Bookbinder | C03C 3/062 428/335 |
| 2012/0171497 A1 | 7/2012 | Koyama et al. | |
| 2012/0240626 A1* | 9/2012 | Matsumoto | C03C 21/002 65/30.14 |
| 2013/0115422 A1 | 5/2013 | Murata | |
| 2014/0106172 A1 | 4/2014 | Dejneka et al. | |
| 2015/0064472 A1 | 3/2015 | Gross et al. | |
| 2015/0064473 A1 | 3/2015 | Dejneka et al. | |
| 2015/0064474 A1 | 3/2015 | Dejneka et al. | |
| 2015/0074974 A1 | 3/2015 | Pesansky et al. | |
| 2015/0132570 A1 | 5/2015 | Lin et al. | |
| 2015/0147575 A1 | 5/2015 | Dejneka et al. | |
| 2015/0147576 A1 | 5/2015 | Bookbinder et al. | |
| 2015/0329418 A1 | 11/2015 | Murata et al. | |
| 2015/0368149 A1 | 12/2015 | Guo et al. | |
| 2015/0376050 A1 | 12/2015 | Nakamura et al. | |
| 2016/0221863 A1 | 8/2016 | Murata et al. | |
| 2016/0347656 A1 | 12/2016 | Kawamoto et al. | |
| 2017/0174557 A1 | 6/2017 | Gross et al. | |
| 2017/0197869 A1 | 7/2017 | Beall et al. | |
| 2018/0141853 A1 | 5/2018 | Momono | |
| 2018/0148370 A1 | 5/2018 | Baker et al. | |
| 2018/0215653 A1 | 8/2018 | Ding et al. | |
| 2018/0319706 A1 | 11/2018 | Murayama et al. | |
| 2019/0161397 A1 | 5/2019 | Beall et al. | |
| 2019/0194057 A1 | 6/2019 | Murayama et al. | |
| 2019/0362754 A1 | 11/2019 | Sato et al. | |
| 2019/0369672 A1 | 12/2019 | Guo et al. | |
| 2020/0062630 A1 | 2/2020 | Dutta et al. | |
| 2020/0079689 A1 | 3/2020 | Guo et al. | |
| 2020/0180999 A1 | 6/2020 | Gross | |
| 2021/0179482 A1 | 6/2021 | Lezzi et al. | |
| 2021/0323862 A1* | 10/2021 | Kanehara | C03C 4/14 |
| 2022/0169556 A1 | 6/2022 | Guo et al. | |
| 2022/0242780 A1 | 8/2022 | Hunt et al. | |
| 2022/0250975 A1 | 8/2022 | Hunt et al. | |
| 2022/0332635 A1 | 10/2022 | Gomez-Mower et al. | |

FOREIGN PATENT DOCUMENTS

| | | |
|---|---|---|
| CN | 113845315 A | 12/2021 |
| DE | 1596922 A1 | 4/1971 |
| FR | 2063272 A5 | 7/1971 |
| GB | 1147122 A | 4/1969 |
| GB | 1177248 A | 1/1970 |
| GB | 1483529 A | 8/1977 |
| JP | 49-097807 A | 9/1974 |
| JP | 09-124338 A | 5/1997 |
| JP | 11-310431 A | 11/1999 |
| JP | 11-310432 A | 11/1999 |
| JP | 2001-151533 A | 6/2001 |
| JP | 2001-180967 A | 7/2001 |
| JP | 2002-047030 A | 2/2002 |
| JP | 5737043 B2 | 6/2015 |
| JP | 2017-030995 A | 2/2017 |
| JP | 2018-095544 A | 6/2018 |
| JP | 2019-032918 A | 2/2019 |
| JP | 2021-075426 A | 5/2021 |
| JP | 2022-177042 A | 11/2022 |
| KR | 10-1398140 B1 | 5/2014 |
| SU | 451652 A1 | 11/1974 |
| SU | 998402 A1 | 2/1983 |
| SU | 1049446 A1 | 10/1983 |
| TW | 201602019 A | 1/2016 |
| WO | 2015/012301 A1 | 1/2015 |
| WO | 2018/088563 A1 | 5/2018 |
| WO | 2019/017404 A1 | 1/2019 |
| WO | 2019/021672 A1 | 1/2019 |
| WO | 2019/021911 A1 | 1/2019 |
| WO | 2019/031189 A1 | 2/2019 |
| WO | 2019/127818 A1 | 7/2019 |
| WO | 2019/131528 A1 | 7/2019 |
| WO | 2020/129578 A1 | 6/2020 |
| WO | 2021/108079 A1 | 6/2021 |
| WO | 2021/113237 A1 | 6/2021 |
| WO | 2021/171761 A1 | 9/2021 |
| WO | 2022/065132 A1 | 3/2022 |
| WO | 2022/145281 A1 | 7/2022 |
| WO | 2022/181812 A1 | 9/2022 |

OTHER PUBLICATIONS

Schaub, Field Guide to Molded Optics, p. 15 viscosity, Downloaded From: https://www.spiedigitallibrary.org/ebooks/ on Dec. 8, 2020, published 2016. (Year: 2016).*

Berneschi et al., "Aluminum co-doping of soda-lime silicate glasses: effect on optical and spectroscopic properties", J. Non-Cryst. Solids, 2005, vol. 351, No. 21-23, pp. 1747-1753.

Berneschi et al., "Optical and spectroscopic properties of a new erbium-doped soda-lime-alumino-silicate glass for integrated optical amplifiers", Proc. SPIE, 2006, vol. 6025, pp. 60251M-1.

Berneschi et al., "Optical and spectroscopic properties of soda-lime alumino silicate glasses doped with Er3+ and/or Yb3+", Optical Materials, 2006, vol. 28, No. 11, pp. 1271-1275.

Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

Corradi et al., "Influence of Al2O3 addition on thermal and structural properties of erbium doped glasses"., J.Mater. Sci., 2006, vol. 41, No. 10, pp. 2811-2819.

Corradi et al., "Structure and properties of Erbium Doped Alumino-Silicate Glasses, Proc.XXth Intern.Congr.on Glass (in CD-ROM)", Kyoto, 2004, No. O-07-072, 10 pages.

Reddy, K.P.R. et al, "Fracture Toughness Measurement of Glass and Ceramic Materials Using Chevron-Notched Specimens," J. Am. Ceram. Soc., 71 [6], C-310-C-313 (1988).

Robelin et al; "Thermodynamic evaluation and optimization of the (NaNO3+KNO3+Na2SO4+K2SO4) system"; J. Chem Thermodynamics 83 (2015), pp. 12-26.

UK Patent Application No. 2318939.2, Search Report dated Feb. 13, 2024, 7 pages (English Translation only), UK Patent Office.

Volarovich et al., "The Relationship Between the Viscosity of Molten Rocks and the Acidity Coefficient According to F. J. Loewinson-Lessing", Dokl.Akad.Nauk SSSR, 1937, vol. 17, No. 8, 12 pages.

Walter et al., "Structural study of magnesium polyphosphate glasses", Journal of Non-Crystalline Solids 320 (2003), pp. 210-222.

* cited by examiner

METHOD OF STRENGTHENING GLASS AND SUCH GLASSES

This application claims the benefit and priority of U.S. Application No. 63/636,156, filed on Apr. 19, 2024 and U.S. Application No. 63/600,790, filed on Nov. 20, 2023, the content of each of which is relied upon and incorporated herein by reference in its entirety.

FIELD

The present Application relates to strengthening glass articles by chemical tempering, imparting an internal compressive stress at and beneath a surface of the glass articles to inhibit crack formation and propagation at the surface as well as to inhibit overall fracture of the glass articles; and the Application relates to such strengthened glass articles.

BACKGROUND

Glass articles, such as medicinal containers, protective cover glasses, vehicle windshields, glass housings for electronic devices, architectural windows and panels, and other glass articles may be strengthened by chemical tempering, such as when such glasses contain alkali metal constituents. With chemical tempering, the glasses may be soaked in a molten salt bath, where smaller alkali metal ions from the glass are swapped out of the glass in exchange for larger alkali metal ions from the salt bath. This so-called "ion exchange" imparts a compressive stress at and beneath a surface in the glass because the larger alkali metal ions are then positioned within and crowd a molecular network of the glass proximate to the surface, but not deeper within the glass. The crowded molecular network drives to expand, but is instead balanced and pulled into compression by glass internal to that crowded network that does not have as many larger alkali metal ions. As such, compressive stress at the surface is offset by a central tension within such chemically-strengthened glass articles.

Applicants find that a rate of ion exchange slows down as glass has been in the molten salt bath longer and longer, resulting in diminishing returns in terms of greater strength. As such, chemical strengthening may only efficiently strengthen a glass so much; after which point, costs of continuing to operate ion-exchange in the salt bath outweighs benefits of greater strengthening, if greater strengthening is even possible. Factors, such as utilization of space in salt baths, energy to heat the bath, evaporation or degradations of the salts, etc., may weigh against longer bath times for diminishing marginal returns in further increased strength.

A need exists for alternative methods of ion-exchange that overcome some or all such deficiencies and allow for greater strength in a given glass and/or more efficient strengthening of the given glass.

SUMMARY

Applicants discovered a process for strengthening glasses that may achieve higher compressive stresses for given glass compositions, that may strengthen such glasses faster than other ion-exchange strengthening processes, and/or that may provide for glasses having strength comparable to other strengthened glasses, but made with constituents that may be better for the environment than some strengthened glasses, for example. Also stress profiles of glasses strengthened by the present technology tend to be extra robust, providing a strong concentration of compressive stress near the surface and into such articles that does not decrease linearly with depth.

First, Applicants believe that salt bath temperature is a significant factor in the ion-exchange process—and Applicants have found greater temperature salt baths may, but only to a point, allow for faster ion-exchange and/or deeper ion-exchange for a given composition. Applicants also found, higher temperature salt baths may undermine glass strength, actually imparting less strength in a given glass. At extra hot temperatures relative to other salt baths for ion exchange, such as over 500° C. for example, glasses such as aluminosilicate or soda-lime glasses, may relax in the salt bath and essentially anneal, where internal compressive stresses initially gained by ion-exchange are contemporaneously relaxed away. Furthermore, Applicants found hotter salt baths may harm the baths themselves by hastening degradation and/or evaporation of salts, for example.

So, after recognizing potential significance of bath temperature to influence ion-exchange, Applicants then experimented to try to overcome obstacles to take advantage of the potential. When testing with different glasses, Applicants discovered that while many are not benefited by extra hot salt baths, some glasses do not relax away the compressive stresses gained in salt baths at temperatures over 500° C., or at temperatures over 550° C., and/or even in salt baths of over 600° C., even when treated by the salt baths for over 30 minutes, such as over an hour, such as over 2 hours, such as over 4 hours, such as over 6 hours. Applicants believe such glasses may be purposefully selected or designed to limit relaxation of stresses at temperatures and for times associated with ion-exchange in extra hot salt baths, and therefore may benefit from corresponding faster/deeper ion-exchange of the extra hot salt baths.

In terms of measurable parameters, Applicants generally find that higher temperatures at which the glass has viscosity of $10^{14.68}$ poise ("strain point" or proximate thereto; cf. temperature at $10^{14.5}$ poise) correlate with ability of the glasses to undergo hotter salt baths without releasing compressive stresses imparted from ion-exchange in the hotter salt baths. The temperature corresponding to $10^{14.68}$ poise may be measured in accordance with ASTM C598.

According to an aspect of the present disclosure, such glasses have temperatures corresponding to glass viscosity of $10^{14.68}$ poise that are greater than the bath temperature (e.g., greatest average temperature over 30 minutes of the salt bath during the ion-exchange, such as hottest 30 minutes unless otherwise specified; or for a full duration of the salt bath, if that bath is less than 30 minutes), such as over 50° C. greater than the bath temperature, such as over 60° C. greater, such as over 70° C. greater, such as over 80° C. greater, such as over 90° C. greater, such as over 100° C. greater, such as over 110° C. greater, such as over 120° C. greater, and/or the glasses have a temperature corresponding to glass viscosity of $10^{14.68}$ poise that is over 550° C., possibly over 600° C. (e.g., for baths at 500°), such as over 650° C., possibly over 700° C. (e.g., for baths at 600° C.) for example. Applicants find a difference of the temperature of the glass corresponding to glass viscosity of $10^{14.68}$ poise minus the salt bath temperature of about 100° C. difference, such as 90° C. or 110° C. difference, may be a sufficiently safe difference to allow the respective glass to benefit from an increased rate of ion exchange/chemical strengthening without substantial loss of strength from relaxation for bath durations disclosed herein, such as over an hour, over 2 hours, over 4 hours, over 6 hours, or other durations disclosed herein.

Applicants believe that glasses may have such higher temperatures at which the glasses have viscosity of $10^{14.68}$ poise by making the glasses with sufficient quantities of high field strength oxide constituents, such as alumina ($Al_2O_3$), magnesia (MgO), zinc oxide (ZnO), and possibly others such as quicklime (CaO) and Yttria ($Y_2O_3$) for example. Conversely Applicants find flux-contributing constituents, such as alkali metal oxides, generally lower such temperatures of glasses corresponding to viscosity of $10^{14.68}$ poise. But, as indicated, in order to facilitate ion-exchange, glasses of technology disclosed herein should at least have sufficient metal alkali content for exchange, such as molar percentages as disclosed herein, such as greater than 3 mol % metal alkali oxides ($R_2O$), greater than 5 mol %, greater than 8 mol %, or other amounts disclosed herein. Further, Applicants found that, when including $R_2O$, lithia ($Li_2O$) make work well at minimizing influence of flux, followed by soda ($Na_2O$), then potash ($K_2O$).

Second, Applicants applied the above-described discoveries to chemically temper glasses such as alkali-containing aluminosilicate glasses, glasses that Applicants find suitable for protective covering uses or other uses as disclosed herein, and glasses that Applicants find to have generally tough and crack-resistant performance with transparency and ability to ion-exchange. Accordingly, Applicants created new glasses such as alkali-containing aluminosilicate glasses useful for ion-exchange in extra-high-temperature salt baths. More specifically, Applicants found that batching silica, alumina, and alkaline earth oxides in a coordinated manner, among other constituents as disclosed herein, such as phosphorus pentoxide ($P_2O_5$), produces glasses that can receive larger alkali ions to impart compressive stress and the glasses also resist relaxation of the compressive stress in extra hot salt baths as disclosed herein. Further, such glasses may have higher temperatures corresponding to glass viscosity of $10^{14.68}$ poise than others of similar transparency, for example.

Applicants previously used large amounts of lithia (lithium oxide, $Li_2O$; e.g., >10 mol %) to chemically temper aluminosilicates to a greater degree in terms of compressive stress and/or to a deeper depth of compression (i.e. depth at which stress changes from compression to tension, as measured with a surface stress meter FSM-6000, manufactured by Orihara Industrial Co., Ltd. used to gather stress data herein). But surprisingly, despite providing a lesser flux contribution, glasses with less lithia (e.g., <10 mol %, such as <8 mol %, such as less than 6 mol %, such as less than 5 mol %) may be chemically tempered faster and/or deeper and/or to a greater degree than otherwise possible using the presently disclosed technology, thus reducing need of lithia, a scarce material that is generally difficult to find and mine. That being said, the presently disclosed technology may also work with glasses containing larger amounts of lithia.

While examples provided herein are to amorphous glasses, and while amorphous glasses greatly benefit from increased strength from ion-exchange, Applicant contemplate glass-ceramics (e.g., residual glass thereof) may be likewise selected or designed to resist relaxation in extra-hot salt bath, and may be chemically tempered faster and/or deeper and/or to a greater degree in salt baths at temperatures greater than over 500° C., or at temperatures over 550° C., and/or even in salt baths of over 600° or otherwise disclosed herein, such as for durations (e.g., >30 min, >1 hr, etc., as disclosed below) in the salt baths as described herein, such as where a glass phase of the glass-ceramic has a temperature corresponding to glass viscosity of $10^{14.68}$ poise greater than the bath temperature, such as by at least 50° C., 80° C., 90° C., 100° C., 110° C., 120° C. greater than the bath temperature, and/or where the temperature corresponding to glass viscosity of $10^{14.68}$ poise is greater than 650° C., such as greater than 700° C., such as greater than 750° C., such as greater than 800° C.

Also, while glass described in examples herein are largely aluminosilicates, Applicants contemplate other alkali-containing silicates, alkali-containing aluminates, and/or alkali-containing glasses in general may likewise benefit from the present disclosure, and may be selected or designed to resist relaxation in extra-hot salt bath, and may be chemically tempered in salt baths at temperatures greater than over 500° C., or at temperatures over 550° C., and/or even in salt baths of over 600° C. to receive compressive stresses with magnitude and profiles disclosed herein, such as for durations (e.g., >30 min, >1 hr, etc.) in the salt baths and with having temperatures corresponding to glass viscosity of $10^{14.68}$ poise greater than the bath temperature, such as by at least 50° C., 80° C., 90° C., 100° C., 110° C., 120° C. greater than the bath temperature, and/or where the temperature corresponding to glass viscosity of $10^{14.68}$ poise is greater than 650° C., such as greater than 700° C., such as greater than 750° C., such as greater than 800° C.

Third, Applicants found that inclusion of sulfur-based salts in mixtures with and in addition to nitrogen-based salts helps reduce loss of the salts due to the hotter temperatures and/or improves ion-exchange with the glasses at the hotter temperatures. More specifically, Applicants found that the extremely hot salt baths benefitted from sulfur-based salts as a substantial weight percentage of the salt baths in addition to nitrogen-based salts for ion-exchange strengthening as disclosed herein. Applying the above discoveries, Applicants strengthened alkali-containing aluminosilicates glasses in new ways, as further disclosed herein. Surprisingly, Applicants found that extra sulfur in the salt baths imparts little, if any, deleterious effects on resulting strengthened glasses, and sulfur is largely absent in correspondingly strengthened glass (e.g., less than 0.1 mol % sulfur dioxide (as representative oxide), such as less than 0.05 mol %, such as less than 0.01 mol %).

According to an Aspect 1 of the present disclosure, a method of manufacturing a strengthened glass article comprises soaking a glass article in a bath. Glass of the glass article comprises, in mol % on an oxide basis, alumina in an amount greater than 10 mol %, such as >12 mol %, >15 mol %, >17 mol %, >20 mol %, >30 mol %, >40 mol %, and less than 75 mol %, such as <65 mol %, such as <60 mol %. The glass also comprises a sum of lithia plus soda greater than 4 mol %, such as >5 mol %, >8 mol %, and/or less than 25 mol %, such as <20 mol %, <16 mol %, <14 mol %, <12 mol %. High field strength constituents balance flux-contributing constituents such that the glass of the glass article has a high strain point temperature corresponding to glass viscosity of $10^{14.68}$ poise, such as at least 600° C., >625° C., >650° C., >675° C., >700° C. The temperature of the bath is at least 70° C. below the strain point temperature of the glass of the glass article, whereby the glass holds compressive stress from ion-exchange in the bath over a sufficiently long duration of the bath, such as at least 30 minutes, such as two, four, six, eight hours, and/or no more than 72 hours. Further, the bath has a temperature greater than 500° C., such as >530° C., >550° C., >580° C., >600° C., and/or less than 800° C. The bath comprises molten salt comprising alkali metal ions with ionic radii greater than that of a lithium ion, such as sodium, potassium, rubidium ions for example. During the soaking, the alkali metal ions of the salt are exchanged for (smaller) lithium and/or sodium ions of the glass of the glass article. After the soaking the glass of the glass article has a compressive stress at a surface thereof (e.g., values disclosed herein, a positive i.e. non-zero, measurable value; >100 MPa, >200 MPa, >500 MPa, and/or <2 GPa; and/or a central tensions, such as >10 MPa, >15 MPa, >30 MPa, and/or <1 GPa; where "at a surface" in this context means proximate thereto as measurable as disclosed herein, such as by surface stress meter), whereby the glass article is strengthened.

According to an Aspect 2, with regard to the method of Aspect 1 the glass comprises greater than 5 mol % quicklime.

According to an Aspect 3, with regard to the method of Aspect 2, after the soaking, a portion of the glass at the surface has less than half an amount of quicklime than is present at a center of the glass in terms of mol %.

According to an Aspect 4, with regard to the method of Aspect 1 the glass comprises less than 5 mol % lithia.

According to an Aspect 5, with regard to the method of Aspect 4 the glass comprises a sum of alumina and alkaline earth oxides greater 20 mol %.

According to an Aspect 6, with regard to the method of Aspect 1, the bath comprises greater than 5 wt % salts comprising sulfur, and comprises more salts comprising potassium than salts comprising sodium in terms of wt %.

According to an Aspect 7, with regard to the method of Aspect 1, after the soaking, the glass article has a region of compressive stress with a profile where magnitude of compressive stress decreases with respect to depth, and the region of compressive stress extends over a distance of depth (A), which is greater than 20 μm and is bounded by a depth of compression where stress in the glass article transitions to tension, and the region has a peak compressive stress (B) that is greater than 100 MPa. The profile is such that an integral of the compressive stress over the distance is greater than a product of (½)AB.

According to an Aspect 8, the method of Aspect 7 further comprises a second soaking at a temperature below 450° C. producing a spike in compressive stress at the surface. The stress B is a knee stress of the profile and the distance A is also bounded by the spike such that the distance A is a change in depth between an interior end of the spike and the depth of compression.

According to an Aspect 9, with regard to the method of Aspect 8, the integral of the compressive stress over the distance is at least 15% greater than the product of (½)AB.

According to an Aspect 10, a glass article comprises a silicate glass comprising soda and quicklime constituents. The glass is alumina rich such that the glass also comprises greater than 17 mol % alumina. A surface portion of the glass is in compression and an internal portion within the glass is in tension. The glass has a greater mol % of soda at the internal portion than at the surface portion, and a lesser mol % of quicklime at the surface portion than at the internal portion.

According to an Aspect 11, with regard to the glass article of Aspect 10, the internal portion of the glass is rich in alkaline earth metal oxides such that the glass comprises greater than 4 mol % thereof.

According to an Aspect 12, with regard to the glass article of Aspect 11, further comprising greater than 8 mol % to less than 20 mol % alkali metal oxides, and wherein lithia is less than 5 mol % of the glass at the internal portion.

According to an Aspect 13, a glass article comprises surfaces facing away from one another and a center positioned equidistantly therebetween. The glass article further comprises glass of the glass article extending between the surfaces and through the center. The glass has a strain point temperature greater than 675° C. corresponding to glass viscosity of $10^{14.68}$ poise. The glass article comprises a region of compressive stress with a profile where magnitude of compressive stress decreases non-linearly with depth. The region of compressive stress extends over a distance of depth (A), which is greater than 20 μm and bounded by a depth of compression, where stress in the glass article transitions to tension. The profile has a peak compressive stress (B) that is greater than 100 MPa. The profile is such that an integral of the compressive stress over the distance is at least 15% greater than a product of (½)AB.

According to an Aspect 14, the glass article of Aspect 13 further comprises a spike of compressive stress with a magnitude exceeding 500 MPa. The stress B is a knee stress of the profile and the distance A is also bounded by the spike such that the distance A is a change in depth between an interior end of the spike and the depth of compression.

According to an Aspect 15, a strengthened glass article comprises glass, which in terms of oxides on a mol % basis comprises greater than 17 mol % and less than 65 mol % alumina, and a sum of lithia and soda greater than 5 mol % and less than 16 mol %. The glass has a strain point temperature of at least 675° C., corresponding to glass viscosity of $10^{14.68}$ poise. The strengthened glass article comprises a positive central tension.

According to an Aspect 16, with regard to the strengthened glass article of Aspect 15, the glass comprises a sum of yttria, quicklime, and magnesia greater than 15 mol % and less than 70 mol %.

According to an Aspect 17, with regard to the strengthened glass article of Aspect 15, the glass comprises a sum of alumina, yttria, quicklime, and magnesia greater than 40 mol %.

According to an Aspect 18, with regard to the strengthened glass article of Aspect 15, the glass comprises at least 5 mol % quicklime, and a surface of the strengthened glass article has less calcium than an interior portion of the strengthened glass article.

According to an Aspect 19, the strengthened glass article of Aspect 15 further comprises a region of compressive stress with a profile where magnitude of compressive stress decreases with respect to depth. The region of compressive stress extends over a distance of depth (A), which is greater than 20 μm and bounded by a depth of compression, where stress in the strengthened glass article transitions to tension. The profile has a peak compressive stress (B) that is greater than 100 MPa. The profile is such that an integral of the compressive stress over the distance is greater than a product of (½)AB.

According to an Aspect 20, the strengthened glass article of Aspect 19 further comprises a spike in compressive stress at the surface. The peak compressive stress B is a knee stress of the profile and the distance A is also bounded by the spike such that the distance A is a change in depth between an interior end of the spike and the depth of compression. An integral of compressive stress over the distance A is at least 15% greater than a product of (½)AB.

According to an Aspect 21, with regard to the strengthened glass article of claim 15, the strain point temperature is at least 700° C., and the glass has an elastic modulus greater than 100 GPa.

According to an Aspect 22, a method of manufacturing a strengthened glass article comprises soaking a glass article in a bath comprising molten salt. The molten salt comprises alkali metal ions. The bath has a temperature greater than 530° C. During the soaking, the alkali metal ions of the salt are exchanged for smaller alkali metal ions of glass of the glass article and impart a compressive stress in the glass article in an ion-exchanged portion thereof at or near a surface thereof. The glass of the glass article has a strain point temperature of at least 625° C., corresponding to glass viscosity of $10^{14.68}$ poise. The temperature of the bath is at least 70° C. below the strain point temperature of the glass of the glass article.

According to an Aspect 23, a strengthened glass article comprises glass having a strain point temperature of at least 600° C., such as at least 650° C., at least 680° C., at least 700° C., greater than 700° C., and/or less than 800° C. corresponding to glass viscosity of $10^{14.68}$ poise. The strengthened glass article comprises a positive central tension, such as greater than 1 MPa, such as greater than 5 MPa, greater than 10 MPa, greater than 15 MPa, and/or less than 1 GPa.

Additional features and advantages are set forth in the detailed description that follows, and in part will be readily apparent to those skilled in the art from the description or recognized by practicing the technology as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE FIGURES

The accompanying figures are included to provide a further understanding and are incorporated in and constitute a part of this specification. The drawings of the figures illustrate one or more aspects of the present disclosure, and together with the detailed description explain principles and operations of the various aspects. As such, the disclosure will become more fully understood from the following detailed description, taken in conjunction with the accompanying figures, in which.

DETAILED DESCRIPTION

Before turning to the following detailed description and figures, which illustrate aspects of the present disclosure in detail, it should be understood that the present inventive technology is not limited to the details or methodology set forth in the detailed description or illustrated in the figures. For example, as will be understood by those of ordinary skill in the art, features and attributes associated with an aspect shown in one of the figures or described in the text relating to an aspect may be applied to another aspect shown in another of the figures or described elsewhere in the text.

Figure 1:
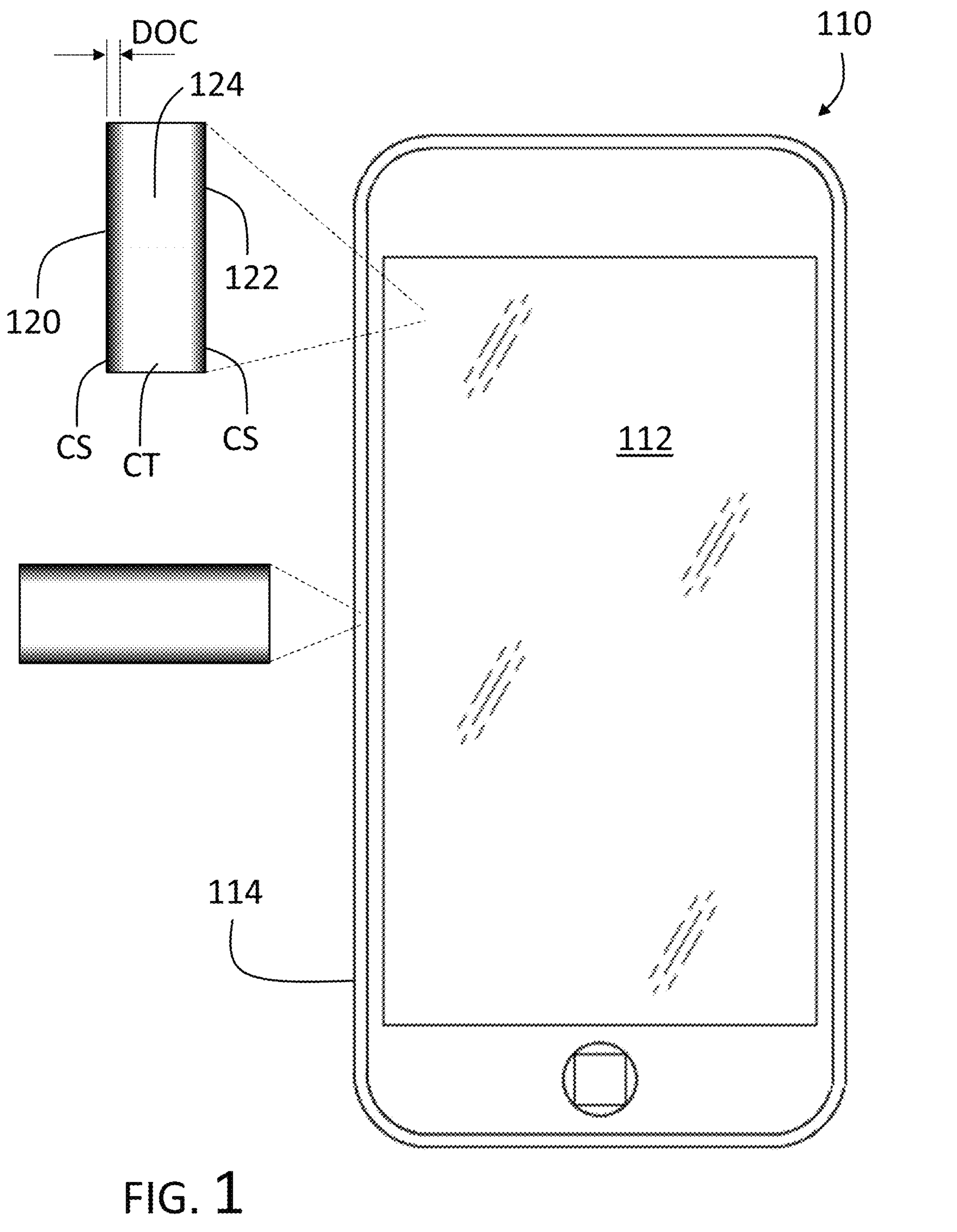
FIG. 1 is a front view of an electronic device including one or more glass articles, such as a glass housing and/or a cover glass, according to an aspect of the present disclosure.

According to an aspect of the present disclosure, a method of manufacturing a strengthened glass article (e.g., flat sheet, curved sheet, sheet of constant thickness, rectangular sheet, tube, cover, glass film, glass tape, rod, container, composite/laminate) includes soaking (e.g., directly contacting at least a portion of the glass article with liquid) the glass article in a bath comprising molten salt. Referring to FIG. 1, the strengthened glass article may be a sheet of glass 112. As used herein, glass refers to amorphous, non-crystalline solid, whereas glass-ceramic includes crystals within a residual glass phase, which may be amorphous glass. For example, a device, such as an electronic device 110, such as a tablet, touchscreen control console, a phone, a portable television, and/or another device may include a display screen, and may further include the sheet of glass 112, such as a so-called cover glass overlaying the screen, protecting components of the display screen and underlying electronics.

Further, in such an instance or alternatively, the electronic device 110 may include a housing 114 at least partially surrounding electronics (e.g., circuitry, battery, memory, processor) of the electronic device 110, and the housing 114 may be strengthened glass as disclosed herein. According to aspect of the present disclosure, the sheet of glass 112 and/or the housing 114 may comprise chemically tempered glass, an amorphous solid having undergone ion-exchange strengthening so as to have a compressive stress (shown as darker portions of the conceptual cross-sectional views denoted by the dashed lines in the FIGS. 1-3) extending inward from a surface 120, 122 into the glass to a depth of compression (DOC), after which a central portion of the glass may be in tension (CT), balancing the compression.

Compressive stress of such strengthened glass may be positioned on an outward facing surface to protect that surface from cracking and other damage. Magnitude of the compressive stress decreases from a peak value (CS), possibly at or near the surface 120, 122, to the DOC (shown as a lightening of the darker portions of the glass cross sections in the FIGS. 1-3). Notably, in FIG. 1, the conceptual strengthened glass cross-section is oriented differently than the sheet of glass 112 in FIG. 1 (i.e. rotated 90°)—where surface 120 corresponds to the forward facing surface shown on the device 110 in FIG. 1.

The sheet of glass 112 overlaying the display screen, as with specific glass examples provided below, may be translucent, such as transparent, and/or having a transmittance of light directed orthogonally into and passing therethrough in a range of 400-750 nm wavelength of at least 86%/mm of thickness, such as at least 88%/mm, such as at least 90%/ mm, such as at least 92%/mm. The sheet of glass 112 may be relatively thin, having a thickness less than 2 mm, such as less than 1.8 mm, less than 1.6 mm, less than 1.2 mm, less than 1 mm, less than 0.8 mm, and/or at least 0.2 mm, such as at least 0.4 mm, and transmittance of light directed orthogonally into and passing fully therethrough in a range of 400-750 nm wavelength at such thicknesses may be at least 80%, such as at least 85%, at least 87%, at least 90%, at least 92%.

According to an aspect of the present disclosure, the sheet of glass 112 of FIG. 1, when viewed in cross-section (as represented by the conceptual sections connected to the device 110 by dashed lines), may include a peak compressive stress at and/or just beneath, proximate to a surface 120, 122 of the sheet of glass 112. As indicated above, compression may be due to ion-exchange, and accordingly the surface may comprise more potash (potassium oxide, $K_2O$) in mol % than a center 124 of the sheet of glass 112, such as at a location equidistant between the surfaces 120, 122 of the sheet of glass 112. Conversely, the center 124 may have a greater concentration of soda (sodium oxide, $Na_2O$) and/or lithia than the surfaces 120, 122. Surprisingly, and for reasons explained herein, the surfaces 120, 122 of the sheet of glass 112 may also or alternatively have less quicklime (calcium oxide, CaO) than the center 124.

As mentioned above, the housing 114 of FIG. 1 may also be a strengthened glass article, and may likewise be formed from glass as disclosed herein and/or strengthened according to methods disclosed herein. According to an aspect, the housing 114 may be colored, such as by inclusion of colorants in the glass, such as transition metal oxides (e.g., oxides of chromium, $Cr_2O_3$; nickel, NiO; cobalt, $Co_2O_3$; titanium, $TiO_2$), and/or gold, silver, or other colorants. As with the conceptual cross-section of glass 112, orientation of the conceptual cross-section connected to the housing 114 is not necessarily aligned with that of the glass of the housing 114 in FIG. 1, but is merely intended to conceptually show that the glass of the housing 114 may be likewise strengthened by chemical tempering and may include compressive stresses at or near the surfaces thereof, balanced by tension in an interior thereof. Such colorants may be a particularly small percentage of the corresponding glass, such as less than 2 mol % on an oxide basis, such as less than 1 mol %, less than 0.5 mol %, and especially small for gold and silver, such as less than 500 ppm, such as less than 300 ppm, but enough to color the glass of the housing 114.

Accordingly, the housing 114 and other articles according to an aspect of the present disclosure, such as at least a portion thereof, such as mostly thereof in terms of surface area, may exhibit transmittance color coordinates in CIELAB color space, as measured at thickness of the housing 114 or other article at a particular location under F2 illumination and a 100 standard observer angle, of L* greater than 50 and/or less than 100, a* greater than −15 and/or less than 25, and b* greater than −25 and/or less than 25. Certainly thickness of the housing 114 or other strengthened glass articles may vary, and portions thereof may have a deeper chroma than other portions. Thicknesses of the housing 114, for example, may fall within a range of 200 micrometers to 5 mm, where portions of the housing 114 of the above-described color space may be 1.3 mm thick for example. Further, the housing may be at least partially translucent, such as having a transmittance of light directed orthogonally into and passing therethrough in a range of 400-750 nm wavelength of at least 2%, such as at least 5%, such as at least 10%, such as at least 20%, and/or no more than 92%, such as no more than 86% for at least a portion of the housing 114 and the respective thickness thereof.

Figure 2:
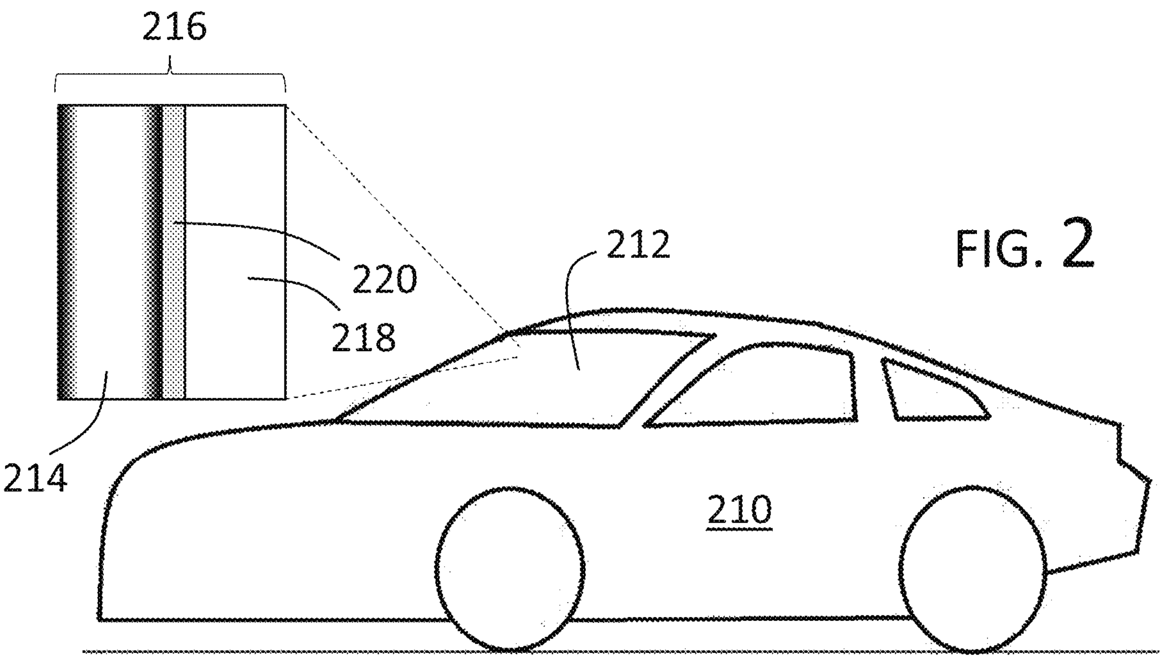
FIG. 2 is a perspective view of a vehicle including one or more glass articles, such as a window and/or a cover glass, according to an aspect of the present disclosure.

Referring now to FIG. 2, beyond electronic devices such as phones and tablet computers, Applicants contemplate the technology disclosed herein likewise benefits other glass articles, such as a windshield 212 of a vehicle 210 (e.g., auto, train, plane). The windshield 212 may be formed at least in part from chemically-strengthened glass 214, similar to the glasses disclosed above and elsewhere herein. For example, the windshield 212 may be a glass-polymer-glass composite laminate assembly 216 that includes a second layer of glass 218, which may be soda-lime glass for example, and a polymer layer 220 adhering the two glasses 214, 218 and providing sound and vibrational damping therebetween. The glass 214 or other glasses disclosed herein (e.g., glass 112) may be coated with anti-reflective coatings, UV-light blocking coatings, or other coatings for example.

According to an aspect of the present disclosure, the glass 214, which is strengthened by the methods disclosed herein, may provide extra strength to an outward facing side of the windshield 212, as shown. However Applicants contemplate windshields or other composite laminate assemblies, where the second layer of glass 218 is also or alternatively chemically-strengthened as disclosed herein, such as a chemically strengthened borosilicate for example. Beyond vehicles, Applicants contemplate similar laminate assemblies may be used in architectural applications, such as with windows or translucent panels for example, or elsewhere.

Figure 3:
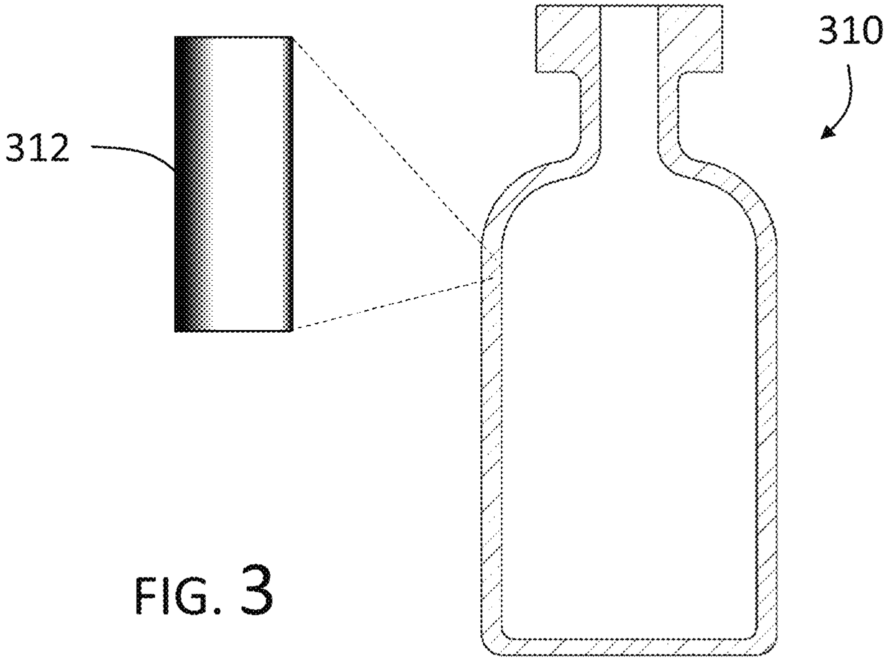
FIG. 3 is a side view of a glass article in the form of a container according to an aspect of the present disclosure.

Referring to FIG. 3, a third example of a strengthened glass article is provided as a container, such as a fluid container 310, such as a medicinal vial or drinking bottle that includes a glass similar to those disclosed above and herein, where the glass has been strengthened by ion-exchange as disclosed herein. Containers such as the fluid container 310 may have ion-exchange strengthening as disclosed with respect to the glasses of FIG. 1, where surfaces 120, 122 of the glass each have about the same degree of compressive stress (CS) and depth of layer (DOC) as one another.

However for glass of the container 310 as shown in FIG. 3, chemical strengthening is greater on one surface than another as represented by the thicker dark portion 312 of the conceptual cross-section. More specifically, the outward facing side of the fluid container 310 has been ion-exchanged according to the method disclosed herein, and has a compressive stress as described herein; but an interior facing surface of the container may have less or no compression. Such a difference could be made by corking the fluid container 310 before bathing the container 310 in an extra hot salt bath as disclosed herein, for example.

Other glass articles may be likewise asymmetrically strengthened. For sheets or otherwise shaped articles, a temporary mask or cover can be used to block ion-exchange to achieve a difference in strengthening between opposite facing surfaces of an article, as shown with the container 310 for example. Asymmetry of compressive stresses may warp the corresponding article, which may be a useful feature, such as to provide curvature to sheets of glass for more rounded applications, such as protecting curved screens or overlaying curved surfaces, for example.

While FIGS. 1-3 provide examples of strengthened glass articles, other strengthened glass articles are contemplated, such as tubes, spheres, rods, etc., and the present disclosure is not meant to only be limited to the specific use-case examples shown.

Referring now to the method of manufacturing a strengthened glass article, as mentioned, the method includes soaking a glass article in a bath comprising molten salt; and according to an aspect of the present disclosure, the bath of molten salt is particularly hot. According to an aspect, the molten salt bath has a temperature greater than 500° C., such as greater than 525° C., such as greater than 550° C., such as greater than 575° C., such as greater than 585° C., such as at least 600° C. According to an aspect, an average temperature of the salt bath for at least 30 minutes is such high temperatures. However, the temperature may be less than 1000° C. for glasses disclosed herein, such as less than 900° C., such as less than 800° C., such as less than 750° C., such as no more than 700° C. For example, the temperature may be between 525° C. and 750° C., such as between 550° C. and 700° C.

At such particularly high temperatures, Applicants find that salt baths of nitrogen-containing salts, such as potassium nitrate ($KNO_3$) and/or sodium nitrate ($NaNO_3$), may fail because the nitrates decompose. However, Applicants created mixed nitrogen-/sulfur-based salt bath chemistries, including both (A) and (B) components. The (A) components include salts containing both potassium and nitrogen, such as potassium nitrate, and/or salts containing both sodium and nitrogen, such as sodium nitrate. The (B) components include salts containing both potassium and sulfur, such as potassium sulfate ($K_2SO_4$), and/or or salts containing both sodium and sulfur, such as sodium sulfate ($Na_2SO_4$). With a sufficient amount of such sulfur-containing salts (the (B) component), the overall mixed nitrogen-/sulfur-based salt bath chemistries operate well in ion exchanges with glasses at the above-disclosed high temperatures.

For example, the following Table 1 provides example mixed nitrogen-/sulfur-based salt bath chemistries for baths of different ratios of potassium (K) and sodium (Na), designed not to break down at high temperatures for ion exchange as disclosed herein.

further comprise salts containing nitrogen, such as potassium nitrate and/or sodium nitrate, such as mostly includes (by wt %) salts containing nitrogen, such as includes greater than 60 wt % salts containing nitrogen, such as includes greater than 70 wt % salts containing nitrogen. According to an aspect of the present disclosure, the bath includes mostly (by wt %) potassium containing salts, such as potassium nitrate and/or potassium sulfate, such as at least 55 wt %, such as at least 60 wt %.

Applicants contemplate, beyond sulfate and nitrate salts, other salts and mixtures of salts may be used to carry alkali metal ions and exchange the alkali metal ions with smaller such ions in glasses disclosed herein, at high temperatures (e.g., >500° C., >600° C.) and for times (e.g., >1 hr, >4 hrs, <72 hrs) as disclosed herein. For example, iodide salts, fluoride salts, as well as chloride salts are contemplated for carrying alkali metals, such as sodium and potassium. However such iodide salts, fluoride salts, as well as chloride salts may be corrosive to metals, and thus may benefit from ceramic containing vessels and conduits supporting such salts.

Compositions of glasses of glass articles as disclosed herein, such as housing 114 of FIG. 1, may comprise silica as the largest mol % constituent as represented by oxide. The glasses may accordingly be characterized as silicates. According to an aspect, silica is the primary constituent of the glasses, in terms of mol %, such as having a mol % of silica greater than that any other individual representative oxide constituent of the glass. Silica may be known to be translucent and hard, and silica likewise provides such properties to glasses disclosed herein. However, too much silica may make the glass difficult to melt or handle due to the high melting temperature of silica. Beyond silicates, Applicants contemplate that other glasses may likewise benefit from the disclosure herein, such as phosphates, borates, etc., likewise so-named by primary constituents thereof.

TABLE 1

| | 100% K (wt %) | 90% K\|10% Na (wt %) | 80% K\|20% Na (wt %) | 75% K\|25% Na (wt %) | 70% K\|30% Na (wt %) | 55% K\|35% Na (wt %) | 60% K\|40% Na (wt %) |
|---|---|---|---|---|---|---|---|
| $NaNO_3$ | 0 | 8.2 | 14.6 | 18.2 | 22 | 25.6 | 29.3 |
| $KNO_3$ | 88.5 | 74.1 | 58.5 | 54.9 | 51.2 | 47.6 | 44 |
| $Na_2SO_4$ | 0 | 1.7 | 5.3 | 6.5 | 7.9 | 9.2 | 10.5 |
| $K_2SO_2$ | 11.5 | 16 | 21.6 | 20.3 | 18.9 | 17.6 | 16.2 |

As such, according to the Table 1, to have a salt bath that fully contains potassium ions for ion exchange (100% K column), the bath would have a mixture of 88.5 wt % $KNO_3$ and 11.5 wt % $K_2SO_4$. Similarly for ion exchange where a significant portion of the salt bath contribution is sodium ions, such as 35% sodium, and the rest is potassium, the bath for ion exchange at temperatures as disclosed may contain a mixture of four salts: 25.6 wt % sodium nitrate, 47.6 wt % potassium nitrate, 9.2 wt % sodium sulfate, and 17.6 wt % potassium sulfate.

According to an aspect of the present disclosure, the soaking is performed in a bath that includes a mixture of nitrogen-/sulfur-based salt that includes at least some potassium ions and may further include sodium ions. According to an aspect of the present disclosure the salt bath includes a positive amount of salts comprising sulfur, such as potassium sulfate and/or sodium sulfate, such as at least 5 wt % of salts comprising sulfur, such as at least 8 wt % of salts comprising sulfur, such as at least 10 wt % of salts comprising sulfur. According to an aspect, the salt bath may The glasses of the housing 114 and sheet of glass 112 as well as the other glasses disclosed herein may include alumina (aluminum oxide, $Al_2O_3$), which Applicants discovered, if sufficiently present, generally helps glasses retain stresses imparted by ion exchange when soaked in particularly hot baths of salt, as disclosed herein. As such, alumina may be a large constituent of the glasses, such as second greatest constituent in terms of mol % and/or at least 8 mol %, such as at least 12 mol %, such as at least 15 mol %, but less than silica and/or less than 30 mol %, such as less than 25 mol % alumina. If the amount of alumina is too high (i.e., greater than 30 mol %), viscosity of the glass melt may increase, thereby diminishing formability. Accordingly, strengthened glasses disclosed herein include aluminosilicates, which Applicants find to be strong and crack-resistant, useful for the electronic device 110 or other purposes.

Beyond alumina, Applicants find that inclusion of alkaline earth oxides as glass constituents, if sufficiently present, improves ability of a glass to endure particularly hot ion exchange baths, as disclosed herein, and still retain compressive stresses from chemical tempering without too much (if any) stress relaxation.

According to an aspect of the present disclosure, glasses disclosed herein include alkaline earth oxides, such as greater than 5 mol % of alkaline earth oxides (in aggregate), such as greater than 6 mol %, greater than 8 mol %, greater than 10 mol %, greater than 12 mol %, greater than 15 mol %, greater than 18 mol %, even greater than 20 mol % in some instances, and/or less than 45 mol %, such as less than 35 mol %, such as less than 25 mol %, such as less than 20 mol % alkaline earth oxides in some instances, such as less than 15 mol % alkaline earth oxides.

Of the alkaline earth oxides, two alkaline earth oxides that Applicants find useful to help a glass endure particularly hot ion exchange baths without relaxing are quicklime and magnesia. Beyond the examples disclosed herein, Applicants have discovered other glasses that may benefit from the present disclosure and include large amounts of alkaline earth metal oxides, such as those disclosed in U.S. Application No. 63/575,885 filed Apr. 8, 2024, which is incorporated by reference herein in its entirety.

Accordingly, the glasses may include a positive amount of quicklime and/or magnesia, such as greater than 2 mol % of quicklime, such as greater than 3 mol %, greater than 5 mol %, such as greater than 6 mol %, greater than 8 mol %, greater than 10 mol %, greater than 12 mol %, greater than 15 mol %, greater than 18 mol %, even greater than 20 mol % in some instances, and/or less than 45 mol %, such as less than 35 mol %, such as less than 25 mol %, such as less than 20 mol %, such as less than 15 mol %; and/or greater than 2 mol % of magnesia, such as greater than 3 mol %, greater than 5 mol %, such as greater than 6 mol %, greater than 8 mol %, greater than 10 mol %, greater than 12 mol %, greater than 15 mol %, greater than 18 mol %, even greater than 20 mol % in some instances, and/or less than 45 mol %, such as less than 35 mol %, such as less than 25 mol %, such as less than 20 mol % in some instances, such as less than 15 mol % magnesia.

In instances where quicklime is a greater mol %, magnesia may be a lesser mol % (if any is included at all) and vice versa, such that a sum of quicklime plus magnesia may be greater than 6 mol %, greater than 8 mol %, greater than 10 mol %, greater than 12 mol %, greater than 15 mol %, greater than 18 mol %, even greater than 20 mol % in some instances, and/or less than 45 mol %, such as less than 35 mol %, such as less than 25 mol %, such as less than 20 mol % in some instances, such as less than 15 mol %. Other alkaline earth oxides, such as strontia (strontium oxide, SrO) and baria (barium oxide, BaO) for example, may likewise benefit such glasses.

According to an aspect of the present disclosure, a large sum of alumina and alkaline earth metal oxides may also facilitate a high temperature corresponding to glass viscosity of $10^{14.68}$ poise for aluminosilicate glasses, such as greater than 18 mol %, such as greater than 20 mol %, such as greater than 22 mol %, such as greater than 23 mol %, such as greater than 25 mol %, such as greater than 30 mol %, such as greater than 35 mol %, such as greater than 40 mol %, such as greater than 50 mol % in instances, and/or less than 70 mol %, such as less than 60 mol %, such as less than 50 mol %, such as less than 40 mol %.

More specifically a sum of alumina, magnesia, and quicklime may facilitate a high temperature corresponding to glass viscosity of $10^{14.68}$ poise for aluminosilicate glasses, such as greater than 18 mol %, such as greater than 20 mol %, such as greater than 22 mol %, such as greater than 23 mol %, such as greater than 25 mol %, such as greater than 30 mol %, such as greater than 35 mol %, such as greater than 40 mol %, such as greater than 50 mol % in instances, and/or less than 70 mol %, such as less than 60 mol %, such as less than 50 mol %, such as less than 40 mol %.

The following Table 1 shows the composition of 63 glasses with constituents provided in terms of mole percents of representative oxides, designed according to the above guidance to produce glasses that may be able to receive and maintain compressive stress from extra hot salt baths. Each of the glasses in the Table 1 has a large amount of alumina as well as a large amount of alkaline earth oxides, particularly quicklime and/or magnesia. Notably, each has a temperature corresponding to glass viscosity of $10^{14.68}$ poise above 650° C., such as above 660° C., above 670° C., many above 680° C., above 690° C., some above 700° C., above 710° C., above 720° C., above 725° C.; and/or below 800° C. Applicants also created other, similar glasses such as E47-E49, which included zirconia, but without measuring temperatures corresponding to glass viscosity of $10^{14.68}$ poise (so measurements not presented). While the glasses of Table 1 were designed to receive and maintain compressive stress from extra hot salt baths without lithia as a constituent, Applicants contemplate lithia may be substituted for soda. Likewise potash may be substituted for soda. The glasses of Table 1 are aluminosilicate cover glasses and have properties as disclosed above, such as transmittance, optionally colored, etc.

TABLE 1

| | unit | E1 | E2 | E3 | E4 | E5 | E6 | E7 | E8 | E9 | E10 | E11 | E12 | E13 |
|---|---|---|---|---|---|---|---|---|---|---|---|---|---|---|
| $SiO_2$ | mol % | 64.15 | 64.11 | 63.61 | 63.97 | 63.29 | 63.91 | 62.05 | 62.15 | 61.71 | 62.17 | 61.64 | 62.02 | 63.11 |
| $Al_2O_3$ | mol % | 17.92 | 18 | 17.91 | 17.92 | 17.94 | 17.91 | 19.03 | 18.96 | 19.09 | 19.01 | 19.39 | 19.09 | 18.03 |
| $P_{205}$ | mol % | 0.99 | 1.97 | 0.98 | 1.97 | 0.97 | 1.97 | 0.99 | 1.99 | 0.98 | 1.99 | — | 0.99 | 0.49 |
| $Na_2O$ | mol % | 11.26 | 11.27 | 11.48 | 11.36 | 11.59 | 11.26 | 11.73 | 11.73 | 12.96 | 12.7 | 13.78 | 13.72 | 11.52 |
| MgO | mol % | 5.49 | 4.48 | 2.91 | 2.29 | 0.12 | 0.1 | 6.05 | 5.02 | 5.11 | 3.98 | 5.03 | 4.04 | 6.65 |
| CaO | mol % | 0.04 | 0.03 | 2.95 | 2.34 | 5.94 | 4.7 | 0.04 | 0.04 | 0.04 | 0.03 | 0.04 | 0.03 | 0.05 |
| $Y_2O_3$ | mol % | — | — | — | — | — | — | — | — | — | — | — | — | — |
| $SnO_2$ | mol % | 0.01 | 0.01 | 0.01 | 0.01 | 0.01 | 0.01 | 0.01 | 0.01 | 0.01 | 0.01 | 0.01 | 0.01 | 0.11 |
| Strain Point | ° C. | 706 | 707 | 706 | 709 | 724 | 724 | 703 | 704 | 704 | 702 | 700 | 702 | 704 |

| | unit | E14 | E15 | E16 | E17 | E18 | E20 | E21 | E22 | E23 | E24 | E25 | E32 | E33 |
|---|---|---|---|---|---|---|---|---|---|---|---|---|---|---|
| $SiO_2$ | mol % | 63.55 | 63.15 | 63.65 | 63.13 | 63.55 | 59.7 | 60.9 | 60.16 | 60.38 | 58.49 | 59.34 | 60.19 | 59.91 |
| $Al_2O_3$ | mol % | 18.19 | 18.09 | 18.22 | 18.05 | 18.1 | 18.99 | 19.03 | 19.05 | 19.04 | 20.07 | 20.01 | 19.1 | 19.07 |
| $P_2O_5$ | mol % | 0.25 | 0.49 | 0.25 | 0.49 | 0.25 | 0.23 | 0.47 | 0.24 | 0.48 | 0.24 | 0.48 | 0.24 | 0.49 |
| $Na_2O$ | mol % | 11.28 | 11.59 | 11.26 | 11.58 | 11.29 | 15.14 | 14.5 | 15.13 | 14.83 | 15.33 | 14.89 | 12.69 | 12.72 |
| MgO | mol % | 6.53 | 3.23 | 3.22 | 0.13 | 0.13 | 5.73 | 4.91 | 5.24 | 5.07 | 5.67 | 5.1 | 7.57 | 7.61 |

TABLE 1-continued

| | | | | | | | | | | | | | | |
|---|---|---|---|---|---|---|---|---|---|---|---|---|---|---|
| CaO | mol % | 0.05 | 3.3 | 3.24 | 6.45 | 6.53 | 0.05 | 0.04 | 0.04 | 0.04 | 0.05 | 0.04 | 0.06 | 0.06 |
| $Y_2O_3$ | mol % | — | — | — | — | — | — | — | — | — | — | — | — | — |
| $SnO_2$ | mol % | 0.11 | 0.11 | 0.11 | 0.11 | 0.11 | — | — | — | — | — | — | — | — |
| Strain Point | 0° C. | 706 | 703 | 707 | 723 | 728 | 685 | 699 | 688 | 693 | 695 | 696 | 695 | 692 |

| | unit | E34 | E35 | E36 | E37 | E38 | E39 | E40 | E41 | E42 | E43 | E50 | E51 | E52 |
|---|---|---|---|---|---|---|---|---|---|---|---|---|---|---|
| $SiO_2$ | mol % | 59.67 | 59.84 | 59.71 | 57.77 | 60.3 | 59.61 | 60.56 | 59.59 | 60.52 | 59.59 | 58.44 | 58.56 | 58.44 |
| $Al_2O_3$ | mol % | 19.05 | 18.98 | 18.93 | 18.77 | 18.45 | 18.87 | 18.39 | 18.89 | 18.37 | 18.85 | 19.33 | 19.42 | 19.45 |
| $P_2O_5$ | mol % | 0.24 | 0.48 | 0.24 | 0.47 | 0.48 | 0.48 | 0.49 | 0.49 | 0.48 | 0.49 | 0.49 | 0.49 | 0.49 |
| $Na_2O$ | mol % | 12.91 | 12.89 | 12.84 | 13.15 | 11.82 | 11.78 | 11.77 | 11.77 | 11.84 | 11.86 | 11.7 | 11.75 | 11.77 |
| MgO | mol % | 3.98 | 3.83 | 0.16 | 0.19 | 0.09 | 0.09 | 2.6 | 3.05 | 2.06 | 2.06 | 0.18 | 1.88 | 3.86 |
| CaO | mol % | 3.98 | 3.83 | 7.94 | 9.48 | 8.72 | 9.01 | 6.04 | 6.07 | 6.57 | 7 | 9.69 | 7.74 | 5.83 |
| $Y_2O_3$ | mol % | — | — | — | — | — | — | — | — | — | — | — | — | — |
| $SnO_2$ | mol % | — | — | — | — | — | — | — | — | 0.01 | 0.01 | 0.11 | 0.11 | 0.11 |
| Strain Point | 0 | 690 | 683 | 697 | 706 | 711 | 707 | 697 | 691 | 696 | 695 | 708 | 699 | 699 |

| | unit | E53 | E54 | E55 | E56 | E57 | E58 | E59 | E60 | E61 | E62 | E63 | E64 |
|---|---|---|---|---|---|---|---|---|---|---|---|---|---|
| $SiO_2$ | mol % | 58.62 | 58.48 | 58.77 | 58.59 | 59.02 | 58.93 | 58.09 | 57.72 | 57.87 | 55.82 | 55.33 | 58.9 |
| $Al_2O_3$ | mol % | 19.45 | 19.43 | 19.33 | 19.6 | 19.57 | 19.53 | 20.03 | 19.97 | 20.08 | 19.9 | 19.63 | 20.08 |
| $P_2O_5$ | mol % | 0.49 | 0.49 | 0.49 | 0.24 | 0.24 | 0.24 | 0.24 | 0.24 | 0.24 | 0.23 | 0.23 | 0.24 |
| $Na_2O$ | mol % | 11.7 | 11.8 | 11.73 | 12.98 | 12.78 | 12.79 | 12.71 | 13 | 12.91 | 12.26 | 12.48 | 11.37 |
| MgO | mol % | 5.73 | 7.72 | 9.47 | 5.04 | 4.09 | 3.31 | 5.2 | 4.39 | 3.47 | 0.22 | 2.43 | 3.66 |
| CaO | mol % | 3.85 | 1.95 | 0.07 | 3.36 | 4.14 | 5.04 | 3.56 | 4.53 | 5.26 | 11.41 | 9.75 | 5.59 |
| $Y_2O_3$ | mol % | — | — | — | — | — | — | — | — | — | — | — | — |
| $SnO_2$ | mol % | 0.11 | 0.11 | 0.11 | — | — | — | — | — | — | 0.1 | 0.1 | 0.11 |
| Strain Point | 0 | 691 | 689 | 694 | 687 | 690 | 679 | 692 | 696 | 690 | 699 | 676 | 693 |

| | unit | E65 | E66 | E67 | E69 | E70 | E71 | E72 | E73 | E77 | E78 | E79 | E80 |
|---|---|---|---|---|---|---|---|---|---|---|---|---|---|
| $SiO_2$ | mol % | 57.27 | 56.93 | 56.03 | 56.38 | 55.47 | 55.57 | 55.22 | 54.63 | 58.23 | 58.02 | 57.52 | 60.1 |
| $Al_2O_3$ | mol % | 20.07 | 20.33 | 20.16 | 20.46 | 20.55 | 20.54 | 20.9 | 21.08 | 19.26 | 18.51 | 19.68 | 19.2 |
| $P_2O_5$ | mol % | 0.24 | 0.24 | 0.24 | 0.48 | 0.48 | 0.48 | 0.47 | 0.48 | 0.49 | 0.49 | 0.25 | — |
| $Na_2O$ | mol % | 11.96 | 11.7 | 11.83 | 11.86 | 12.46 | 12.49 | 12.22 | 12.44 | 11.04 | 10.85 | 12.46 | 12.8 |
| MgO | mol % | 6.12 | 8.59 | 11.52 | 5.18 | 2.65 | 5.24 | 2.69 | 5.56 | 3.64 | 3.46 | 3.33 | 3.9 |
| CaO | mol % | 4.19 | 2.06 | 0.08 | 5.48 | 8.24 | 5.53 | 8.33 | 5.64 | 5.68 | 5.51 | 5.1 | 3.9 |
| $Y_2O_3$ | mol % | — | — | — | — | — | — | — | — | 1.52 | 3.02 | 1.52 | — |
| $SnO_2$ | mol % | 0.1 | 0.1 | 0.1 | 0.11 | 0.11 | 0.11 | 0.11 | 0.11 | 0.1 | 0.1 | 0.11 | 0.1 |
| Strain Point | U | 677 | 689 | 682 | 682 | 689 | 685 | 687 | 671 | 697 | 704 | 694 | 682 |

For purposes of comparison, an example glass C1 includes 66.37 mol % silica, 10.29 mol % alumina, 5.74 mol % magnesia, 0.59 mol % quicklime, 13.8 mol % soda, 2.4 mol % potash, as well as 0.6 mol % boria (boron oxide, $B_2O_3$), and 0.21 mol % tin oxide ($SnO_2$), which had a temperature corresponding to glass viscosity of $10^{14.68}$ poise of 553° C. Another example C2 includes 67.37 mol % silica, 12.65 mol % alumina, 2.36 mol % magnesia, 0.04 mol % quicklime, 13.72 mol % soda, 0.01 mol % potash, 3.73 mol % boria, 0.1 mol % tin oxide, and 0.01 mol % iron oxide ($Fe_2O_3$), which had a temperature corresponding to glass viscosity of $10^{14.68}$ poise of 572° C. Notably, both examples had less of alumina and/or alkaline earth oxides than the examples of Table 1 and both examples had temperatures corresponding to glass viscosity of $10^{14.68}$ poise below 600° C.

As indicated, metal ions from alkali metal oxides in the glass may be swapped for larger ions in a salt bath to impart compressive stress in a chemically tempered glass. But, even after ion exchange, glasses may retain a positive amount of the smaller alkali metal oxides, such as at a center of the glasses, beneath the depth of compression. According to an aspect of the present disclosure, suitable glasses may comprise a positive amount of soda, such as at least 3 mol %, such as at least 5 mol %, such as at least 8 mol %, such as at least 10 mol %, and/or no more than 25 mol %. Similarly, the glasses may further include a positive amount of lithia, such as at least 0.5 mol %, such as at least 1 mol %, such as at least 2 mol %, and/or no more than 25 mol %, and may have far less lithia than other glasses due to the improved ion-exchange technology disclosed herein, such as less than 10 mol %, such as less than 8 mol %, such as less than 6 mol %.

At least after ion exchange, the glasses may have a positive amount of larger alkali metal content, such as a positive amount of potash in terms of mol % on an oxide basis, such as at least 0.1 mol %, such as at least 0.25 mol %, such as at least 0.5 mol %, such as at least 1 mol %, and/or no more than 10 mol %, such as not more than 5 mol % potash. Furthermore, after ion exchange, the glass may have a greater amount of potassium at or near the surface of the glass than at a center of the glass, beneath a depth of compression of the glass (see generally FIGS. 8-10 and related disclosure). Conversely, after ion exchange, the glass may have a lesser amount of sodium at or near the surface of the glass than at a center of the glass, beneath a depth of compression of the glass. Likewise, for glasses initially comprising a substantial amount of lithia (e.g., >2 mol %), the glass after ion exchange may have a lesser amount of lithium at or near the surface of the glass than at a center of the glass, beneath a depth of compression of the glass.

Beyond silica, alumina, alkaline earth metal oxides, and alkali metal oxides, Applicants find phosphorus pentoxide to be a useful constituent to facilitate ion exchange as disclosed herein. Phosphorus pentoxide increases diffusivity of ions in the glass article during ion exchange, thereby increasing the efficiency; but too much may harm formability and/or durability. According to an aspect, the glasses may include a positive amount of phosphorus pentoxide, such as at least 0.1 mol %, such as at least 0.25 mol %, such as at least 0.5 mol %, such as at least 1 mol %, and/or no more than 10 mol %, such as no more than 8 mol %.

According to an aspect of the present disclosure, glasses for chemical tempering according to the present disclosure may be selected and/or designed to have a high temperature corresponding to glass viscosity of $10^{14.68}$ poise, such as a temperature corresponding to glass viscosity of $10^{14.68}$ poise over 550° C., such as over 600° C. (e.g., for baths at 500°), such as over 650° C., such as over 700° C. (e.g., for baths at 600° C.) for example. For silicates, as disclosed herein, high amounts of alumina and alkaline earth oxides in combination with silica as disclosed above may facilitate such temperatures corresponding to glass viscosity of $10^{14.68}$ poise. For example, such glasses may have greater than 55 mol % silica, greater than 17 mol % alumina, and at least 4 mol % alkaline earth oxides as well as sufficient soda for ion exchange, such as at least 10 mol %, where a resulting glass may have transmittance as disclosed above as well as a temperature corresponding to glass viscosity of $10^{14.68}$ poise as just described, and then may be suitable for chemical tempering in particularly hot salt baths with mixed sulfur- and nitrogen-based salts, as disclosed, such as for at least 30 minutes of soaking at the above temperatures, such as at least 1 hour, at least 3 hours, at least 8 hours, and/or no more than 48 hours for example.

Figure 4:
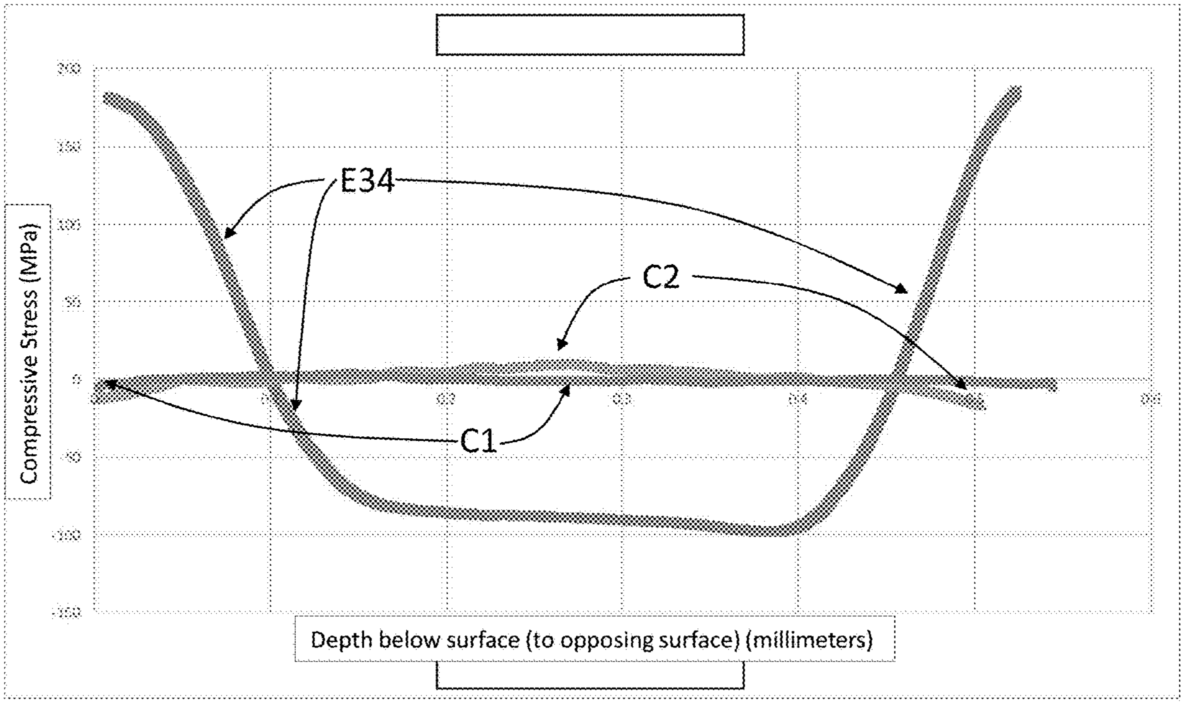
FIG. 4 is a plot of compressive stress as a function of depth below a surface according to an aspect of the present disclosure.

By way of example, FIG. 4 compares ion exchange performance of three glasses in extra hot salt baths. The salt bath was at a temperature of 600° C. for 16 hours, where the salt bath included mixture of sulfur and nitrogen based salts. More specifically the mixture was 65 wt % potassium (K) salts and 35 wt % sodium (Na) salts, including both sulfur and nitrogen salts for each alkali metal according to the distribution of Table 1: 25.6 wt % sodium nitrate, 47.6 wt % potassium nitrate, 9.2 wt % sodium sulfate, and 17.6 wt % potassium sulfate. The first glass ("E34") is representative of glasses designed according to the presently disclosed guidance and includes 59.67 mol % silica, 19.05 mol % alumina, 3.98 mol % magnesia, 3.98 mol % quicklime, as well as 12.91 mol % soda and 0.24 mol % phosphorus pentoxide. The second and third glasses in FIG. 5, C1 and C2 described above were also aluminosilicates, but with less combined alumina and alkaline earth metal oxides and/or with lower temperatures corresponding to glass viscosity of $10^{14.68}$ poise than E34.

A clear difference in results are shown in FIG. 4 for stress profiles after the above described salt baths for glasses C1 and C2 compared to E34. Glass E34 receive a robust region of compressive stress, with compressive stress near the surface (at Depth of 0 in the FIG.) exceeding 100 MPa, such as exceeding 150 MPa, and a tensile stress (negative compressive stress) exceeding 50 MPa, such as exceeding 75 MPa for at least a portion of the stress profile. Furthermore, the depth of compression beneath the surface was about 0.1 mm, or about 100 micrometers, such as greater than 20 μm, greater than 40 μm, greater than 50 μm, greater than 60 μm. Further, the stress profile was robust, where compressive stress remained high into the glass, as opposed to only having higher compressive stress near the surface. Quantitatively, the stress profile was such that area per region of compressive stress (i.e. beneath each surface) was greater than 3 kPa·m, such as greater than 4 kPa·m, such as greater than 5 kPa·m, as shown in FIG. 4.

According to an aspect of the present disclosure, ion exchange may occur in two or more separate soaking steps, such as a first soaking to achieve a deep, robust depth of compression and a high level of compressive stress (see, e.g., stress profile of E34 in FIG. 4), and then a second, soaking step in a separate salt bath to achieve a particularly high compressive stress near the surface (a so-called spike). The salt bath of the second soaking may comprise all nitrogen-based salts, such as mostly potassium nitrate and potentially some sodium nitrate, and/or may be shorter in duration than the first soaking. Multiple soaking steps may allow for a deep and robust layer of compressive stress with a shallow spike of higher compressive stress near the surface, which may improve both drop performance as well as scratch resistance for articles such as cover glasses.

Figure 5:
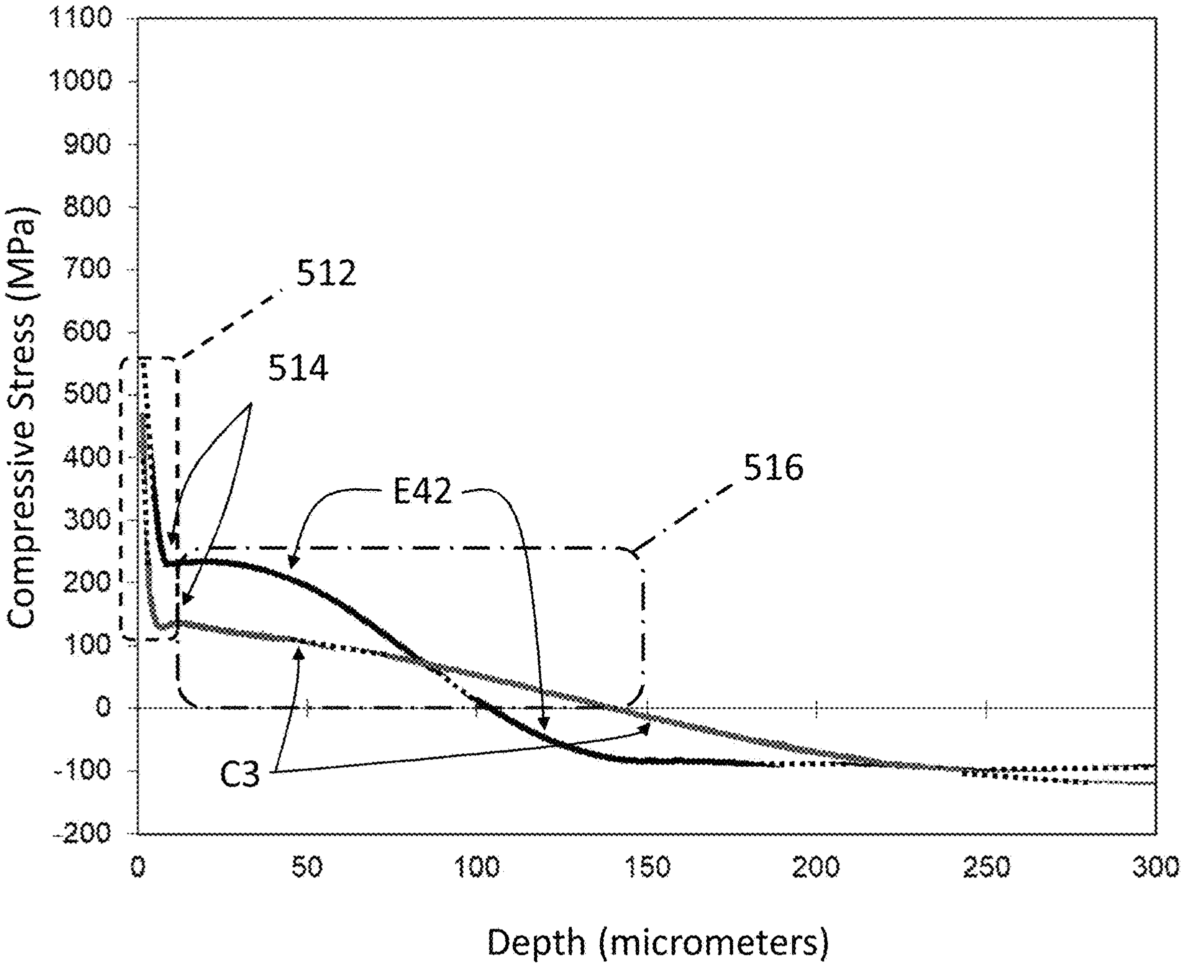
FIG. 5 is a plot of compressive stress as a function of depth below a surface according to another aspect of the present disclosure.

Referring now to FIG. 5, a sheet of glass of E42 composition (60.52 mol % silica, 18.37 mol % alumina, 0.48 mol % phosphorus pentoxide, 11.84 mol % soda, 2.06 mol % magnesia, 6.57 mol % quicklime, and 0.01 mol % tin oxide, with temperature corresponding to glass viscosity of $10^{14.68}$ poise of 696° C.) from Table 2 with thickness of 0.6 mm was first soaked in a salt bath of 75% K and 25% Na according to Table 1 (18.2% sodium nitrate, 54.9% potassium nitrate, 6.6% sodium sulfate, and 20.3% potassium sulfate) at a bath temperature of 600° C. for 16 hours. Second, the glass was then soaked in a 100% potassium nitrate at 370° C. for 1 hour to receive a spike of compressive stress near the surface. The FIG. 6 also includes the stress profile of another glass (C3), that includes about 58 mol % silica, 18 mol % alumina, 4 mol % magnesia, 1 mol % quicklime, 11 mol % lithia, 2 mol % soda, and 6 mol % boria, ion-exchanged at temperatures well below 500° C. (e.g., about 400°) in nitrate salt baths (e.g., sodium and potassium nitrate).

Both stress profile curves in FIG. 5 include compressive stress spikes 512 near and just beneath the surface, such as at depths of 10 micrometers and less. The spikes 512 are from the second soakings, and result in shallow but high surface compressive stresses, such as greater than 500 MPa, greater than 600 MPa, and conceivably even greater than 650 MPa or 700 MPa.

With both curves in FIG. 5, there is a critical point 514 (or corner point), possibly preceded by a slight dip in in compressive stress, where the compressive stress curve abruptly changes from stress imparted by a second soaking to produce the spike 512. Some may refer to the critical point as "knee stress," or the peak amount of compressive stress remaining from a first soaking. According to an aspect, stress at the critical point 514 (also 614) is greater than 100 MPa, such as greater than 150 MPa, such as greater than 200 MPa. The critical points 514 demarcate where the respective stress profile curves then connect to main portions 516 of the compressive stress regions resulting from the first soaking. For stress profile curves without spikes and only a first soaking, a corresponding "critical point" or beginning of the main portion 516 of the respective compressive stress region would simply be the surface, the end of the curve (see generally profile of E34 in FIG. 4). According to an aspect, the main portion 516 of the compressive stress profile corresponds to curvature for at least a continuous length of the depth (i.e., inward, orthogonal to surface; see generally A in FIG. 6) that is greater than 10 micrometers, such as greater than 20 micrometers, such as greater than 30 micrometers, such as greater than 50 micrometers, such as greater than 75 micrometers as shown in FIGS. 5 and 6 with respect to the curves for E42 and E34 glasses.

Notably, the main portion 516 of the compressive stress curve corresponding to C3 in FIG. 5 is generally linear, decreasing from the critical point 514 in proportion to depth until the curve passes zero compressive stress, the "depth of compression." By contrast, the compressive stress curve of E42 in FIG. 5, is representative of stress imparted by particularly hot salt baths with correspondingly suitable glasses, as disclosed herein, and appears rounded outward, or bowed, almost sinusoidal as a function of depth between the critical point 514 and the depth of compression, such as roughly the function $y(x)=B\cdot\cos[(\pi x)/(2A)]$, where A is the distance from the depth of the critical point 514 to the depth of compression (i.e. x-intercept in FIG. 5) and B is compressive stress at the critical point 514, where B would be the y-intercept if there were no spike 512 (again, see generally curve for E34 in FIG. 4). Accordingly, while perhaps not as deep in terms of depth of compression, the compressive stress of E42 is concentrated to a greater degree closer the surface when compared to that of C3, which may add robustness to the sheet of E42.

Figure 6:
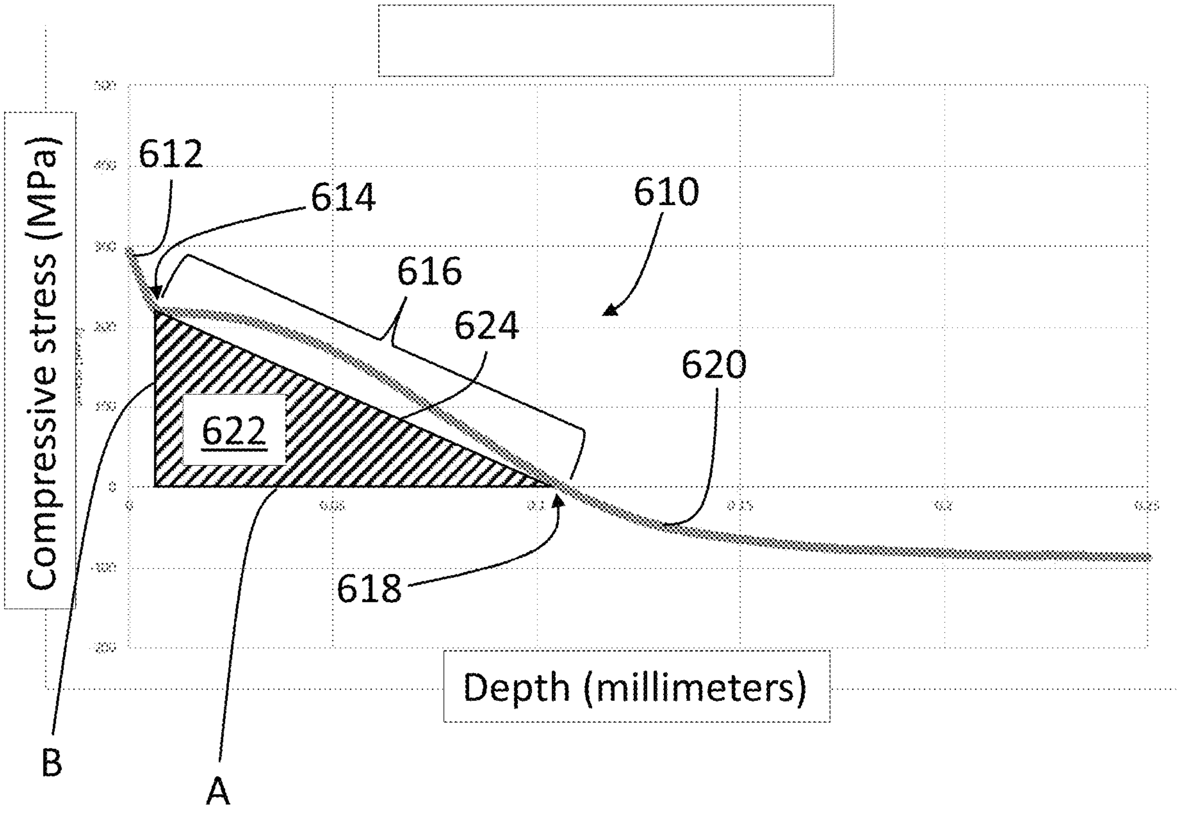
FIG. 6 is a plot of compressive stress as a function of depth below a surface according to yet another aspect of the present disclosure.

As another example representative of glasses and chemical tempering disclosed herein, FIG. 6 shows a stress curve 610 of a 0.6 mm sheet of the E34 glass, described above with respect to FIG. 4, after soaking for 16 hours at 600° C. in a mixed salt bath of 70% K and 30% Na according to Table 1, i.e. 22 wt % sodium nitrate, 51.2 wt % potassium nitrate, 7.9 wt % sodium sulfate, and 18.9 wt % potassium sulfate. Again, there is a spike 612 from a second, shorter soaking in lower temperature salt bath of 100% nitrate salt. Where the spike 612 ends is a critical point 614 on the curve 610 in FIG. 6, similar to the critical points 514 in FIG. 5, characteristic of how such spikes 514, 614 connect with the underlying, main body 616 of the compressive stress achieved from the first soaking. The main body 616 extends into the glass and ends at the depth of compression 618, where the curve passes through the x-axis in FIG. 6. Beyond the depth of compression 618, compressive stress is negative, corresponding to a region of central tension 620 in the glass.

According to an aspect of the present disclosure, as with the compressive stress curve in FIG. 5 corresponding to E42, the main body 616 of the compressive stress profile in FIG. 6 is nonlinear. Instead, the curve decreases in a generally sinusoidal manner (e.g., roughly $y(x)=B\cdot\cos[(\pi x)/(2A)]$ as described above) with respect to depth from the critical point 614, where the spike connects to the main body 616 of the compressive stress profile, and which extends to the depth of compression 618. For comparison, a right triangle 622 is shown in FIG. 6 beneath the main body 616 of the compressive stress profile, with the hypotenuse 624 of the triangle 622 connecting the critical point 614 and depth of compression 618, and with the sides of the triangle 622 being A and B.

Notably, there is substantial area between the hypotenuse 624 and the main body 616 of the compressive stress curve 610. This additional compressive stress is loaded into the E42 glass between the end of the spike 612 and the depth of compression 618 by the extra hot salt bath disclosed herein. Further, the additional compressive stress may correspondingly improve crack resistance of the E42 glass for cracks that may otherwise extend into that depth, such as if the E42 were instead chemically tempered in the manner shown for C3 in FIG. 5.

Increased compressive stress loaded into the stress profiles of E42 in FIG. 5 and E34 in FIG. 6, as well as other such glasses chemically tempered as disclosed herein, can be quantified compared to those with linearly decreasing compressive stresses. For example, the integral of $B\cdot\cos[(\pi x)/(2A)dx$ from 0 (i.e. depth of critical point) to A reduces to simply $2AB/\pi$, and the area the triangle is (½)AB. In terms of percentage increase in compressive stress for the outwardly rounded, bowed (generally sinusoidal) main body compared to that of the triangular linearly-decreasing curve, the AB term drops out and the percentage is simply 100% times $2[(2/\pi)-(1/2)]$, or roughly 27%. This value is a back-of-the-envelope approximation of increased compressive stress in the main body 616, versus a linearly decreasing curve. According to an aspect of the present disclosure, compressive stress in glass chemically strengthened as disclosed herein is greater than (½)AB i.e. greater than the product of 0.5, the compressive stress at the critical point (or at the surface if no spike) (B), and the distance of the main portion of the compressive stress curve in terms of depth (A), such as at least 10% greater than (½)AB, such as at least 15% greater, at least 20% greater, at least 25% greater than (½)AB.

Figure 7:
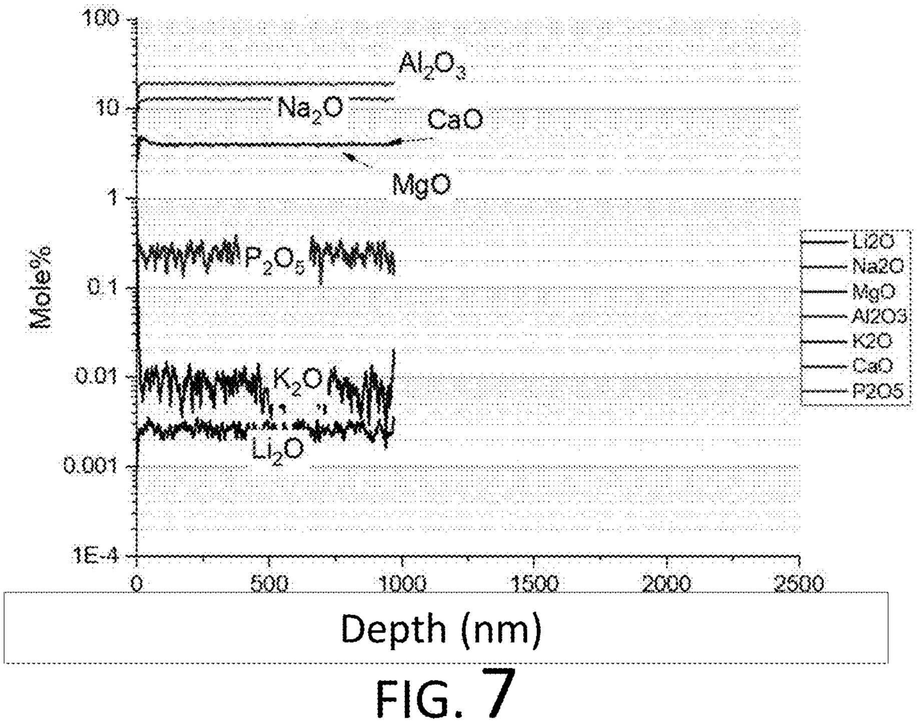
FIG. 7 is plot of mole percentage of constituents as a function of depth according to an aspect of the present disclosure.
Figure 8:
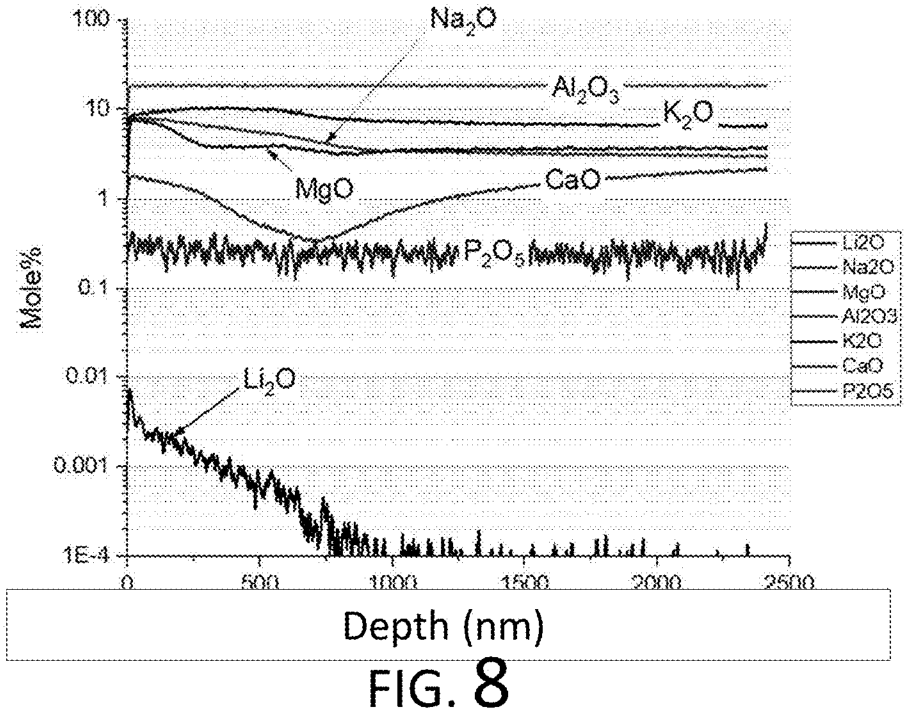
FIG. 8 is a plot of mole percentage of constituents as a function of depth according to an aspect of the present disclosure.
Figure 9:
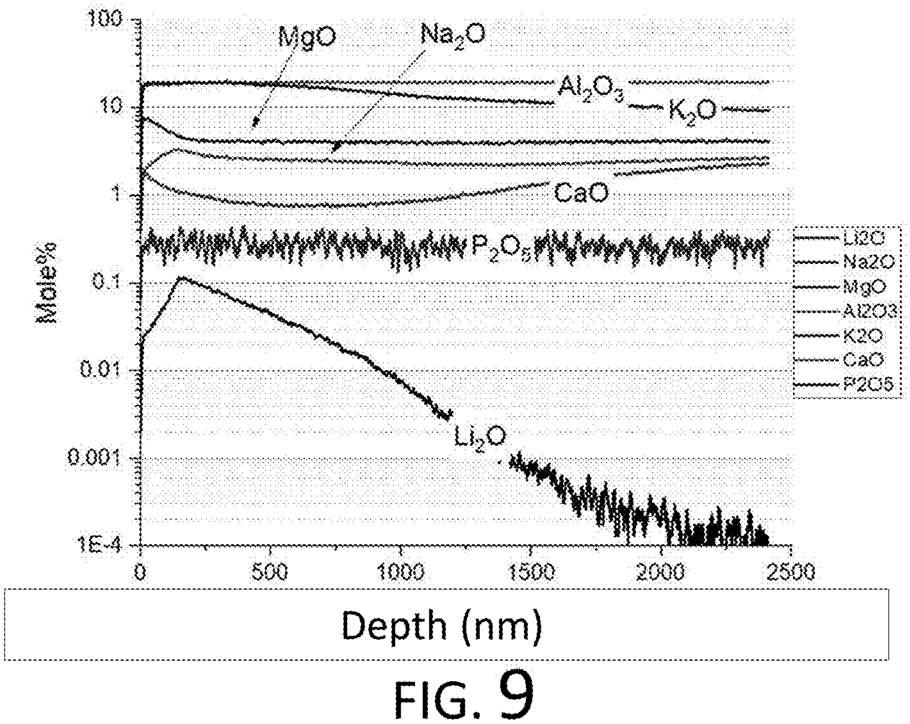
FIG. 9 is a plot of mole percentage of constituents as a function of depth according to an aspect of the present disclosure.
Figure 10:
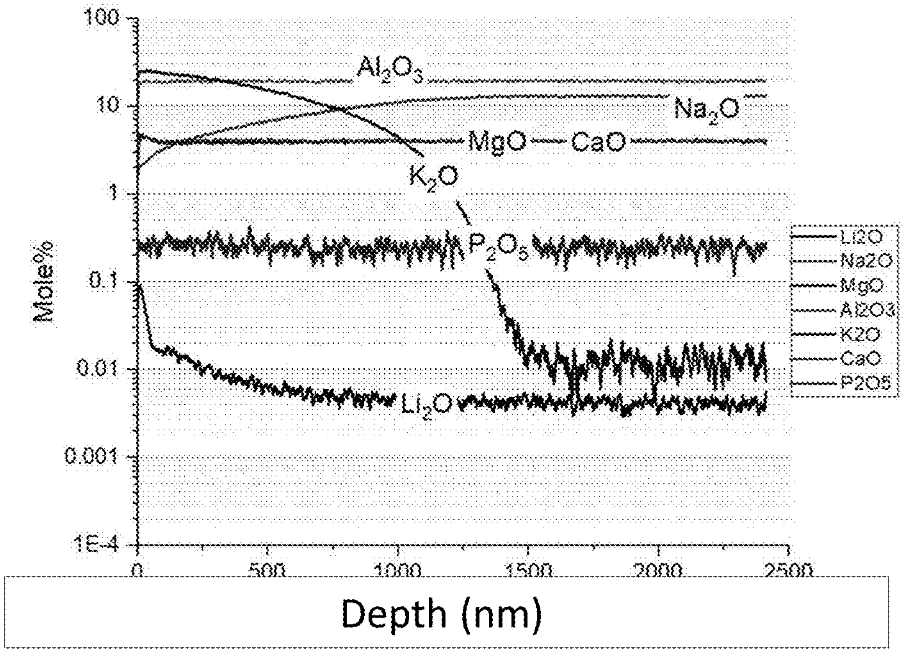
FIG. 10 is a plot of mole percentage of constituents as a function of depth according to an aspect of the present disclosure.

Referring now to FIGS. 7-10, the E34 glass was given four treatments: (1) nothing—no salt bath, representative of starting E34 glass and also representative of composition at a center of an article of E34 after ion exchange, at depths unaffected by salt bath; (2) soaked in 65% K, 35% Na mixed salt bath (as per Table 1) at 600° C. for 16 hours ("step 1"; first soaking); (3) first (again) soaked in 65% K, 35% Na mixed salt bath (as per Table 1) at 600° C. for 16 hours ("step 1"), and then soaked for 10 minutes in a second salt bath of 100% potassium nitrate at 370° C. ("step 2"; second soaking); and (4) only soaked for 10 minutes in a second salt bath of 100% potassium nitrate at 370° C. (i.e. only step 2). FIG. 7-10 show quantified plots of the constituents of the E34 glass in mol % (Y-axis) relative to depth at and into the surface in nanometers (X-axis) after having undergone each of the treatments, where FIG. 7 corresponds to treatment (1), nothing, no salt bath. FIG. 8 shows step 1 only, or glass only receiving the first soaking in the mixed sulfur- and nitrogen-based salt bath. FIG. 9 shows glass after having undergone both the first and second soakings (steps 1 and 2), where the second soaking was to achieve a compressive stress spike (as shown in FIG. 5). FIG. 10 shows glass only having undergone the second soaking (i.e. step 2 only), not the first soaking.

The amount of potash ($K_2O$) in mol % in each of FIGS. 8-10 far exceeds that of the glass in FIG. 7; and conversely, the amount of soda ($Na_2O$) present in the glass of FIG. 7 far exceeds that in FIGS. 8-10. In both instances, this difference is a result of ion-exchange where larger potassium ions from the salt baths have been swapped into the glass for sodium ions, which were in the glass prior to the ion-exchange. This ion-exchange happens with both step 1 and step 2.

Applicants discovered another, surprising trend, which may be unique to the extra-high temperature salt baths and/or salt baths comprising sulfur-based salts in combination with glasses disclosed herein, such as those with greater than trace amounts of quicklime. After the first soaking, the glass had a dip in quicklime (CaO) near the surface, as shown in both FIGS. 8 and 9. But, as can be seen by comparison to the composition of the glass of FIG. 10, the dip in quicklime only occurred from the first soaking i.e. corresponding to the elevated bath temperature. Calcium was not pulled from the glass in the step-2-only treatment with the lower temperature salt bath of nitrate salts. Furthermore, the dip in calcium as shown in both FIGS. 8 and 9, at and near the surface of the glass, results in a calcium content less than is present in the pre-ion-exchanged glass of FIG. 7, which is also representative of composition at the center of such an article, before or after ion-exchange.

Figure 11:
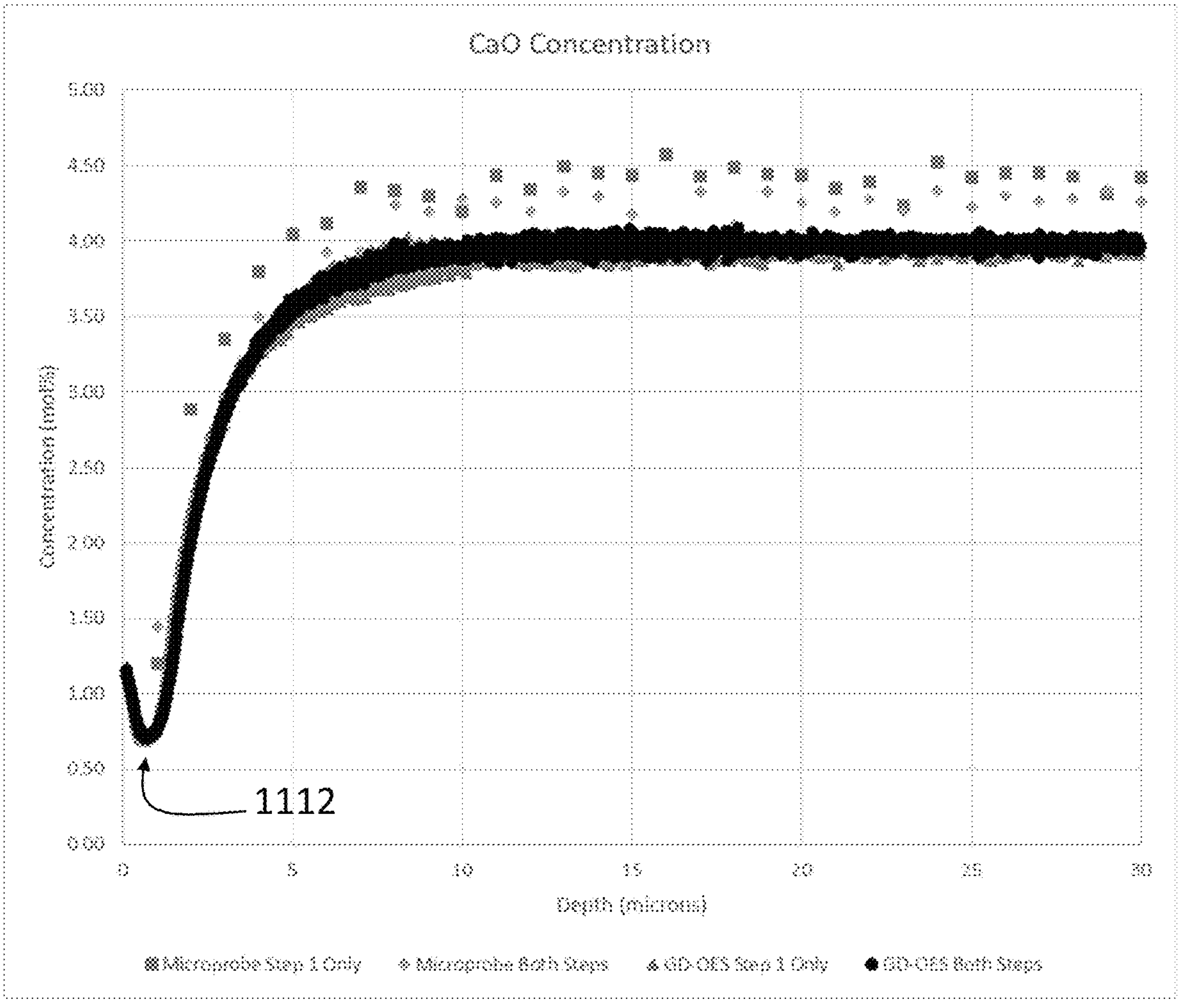
FIG. 11 is a plot of mole percentage of quicklime as a function of depth according to an aspect of the present disclosure.

To confirm the unexpected finding of a dip 1112 in quicklime at and near the surface, Applicants repeated the measurement using both microprobe and glow discharge optical emission spectrometry, as shown in FIG. 11. Both measurement techniques were done on E34 glass following treatments (2) and (3) described above i.e. with only the first soaking at the high temperature for 16 hours in the mixed salt bath ("step 1") as described, and that same first soaking plus a shorter second soaking in potassium nitrate at lower temperatures ("step 2"). As can be seen in FIG. 11, in both instances the measurements showed a dip in quicklime at and just beneath the surface. The depth scale (X-axis) for FIG. 11 is greater than that of FIGS. 7-10, and shows that the dip then returns to approximately the initial amount in mol % (averaged over the full volume, about 4 mol % for the example E34 glass; e.g., within 10% of the initial amount, such as within 5% thereof, such as within 2%), a steady/constant amount of quicklime at about 10 micrometers depth from the surface, such as greater than 2 micrometers, greater than 4 micrometers, greater than 5 micrometers, and even greater than 7 micrometers, but less than 50 micrometers, such as less than 25 micrometers, such as less than 20 micrometers. Further, as shown in FIG. 11, the concentration of quicklime in the dip 1112 dropped to less than half the initial amount, of quicklime such as less than ⅓, such as less than ¼.

Applicants made glass having 42 mol % silica, 28 mol % alumina, 14 mol % lithia, and 16 mol % yttria; and chemically tempered the glass in a molten salt bath at 600° C., the bath comprising a mix of nitrate and sulfate salts of sodium and potassium, as described above, such as 25.6 wt % sodium nitrate, 47.6 wt % potassium nitrate, 9.2 wt % sodium sulfate, and 17.6 wt % potassium sulfate.

The above yttria-containing lithio-aluminosilicate glass was soaked in the above 600° C. mixed sulfate/nitrate salt bath for 9 hours and gained 0.38 wt % of weight. When soaked for 25 hours, the glass gained 0.64 wt % of additional weight. When soaked for 36 hours, the glass gained 0.69 wt %. When soaked for 49 hours, the glass showed 1.05 wt % gain.

The ion-exchanges for 9 and 25 hours resulted in a hazy surface of the tempered glass; but according to an aspect, in addition to molten salt, the baths may further add (on top of the 100 wt % of molten salts) a small amount of sulfuric acid, such as 0.25 wt % to 1 wt % for example, which may help prevent or control hazy surfaces of the glass from the salt.

The same yttria-containing lithio-aluminosilicate glass was also treated in a fully nitrate salt bath (e.g., 88.5 wt % potassium nitrate, 11.5 wt % sodium nitrate) at 530° C. for 49 hours, which showed 0.30 wt % gain and a central tension of 63 MPa, as per refracted near-field method, as described in U.S. Pat. No. 8,854,623, incorporated by reference herein in its entirety. For context, the ion-exchange at 600° C. for only 36 hours resulted in a central tension calculated at 128 MPa, over double the stress imparted from the longer running, but lesser temperature salt bath.

According to an aspect, glasses as disclosed herein gain weight from ion-exchange in salt baths as disclosed herein and receiving larger alkali metal ions, such as at least 0.1 wt %, at least 0.2 wt %, at least 0.25 wt %, at least 0.4 wt %, at least 0.5 wt %, and/or no more than 100%, such as no more than 50%.

According to an aspect, glasses disclosed herein that benefit from the ion-exchange technology disclosed herein may comprise yttria ($Y_2O_3$), such as at least 4 mol %, at least 8 mol %, at least 10 mol %, at least 12 mol %, at least 14 mol % and/or not more than 30 mol %, such as not more than 25 mol %, such as not more than 20 mol % yttria.

According to an aspect, glasses disclosed herein comprise lithia ($Li_2O$) as provided in the yttria-containing lithio-aluminosilicate glass for example, such as the above-disclosed amounts and ranges, further including at least 10 mol %, such as at least 12 mol %, and/or no more than 30 mol % lithia.

In addition to glasses disclosed above, Applicants found aluminate glasses, such as glasses having less silica than alumina (e.g., greater than 30 mol % alumina and/or less than 30 mol % silica) and large amounts of alkaline earth oxides as disclosed above (e.g., >25 mol % magnesia plus quicklime), benefit from the presently disclosed ion-exchange technology when including alkali metal oxides, such lithia or soda.

Applicants made a first such glass comprising 28.6 mol % silica ($SiO_2$), 30.1 mol % alumina ($Al_2O_3$), 10.8 mol % soda ($Na_2O$), 4.3 mol % magnesia (MgO), 24.4 mol % quicklime (CaO), and 1.8 mol % zirconia ($ZrO_2$); and a second such glass comprising 28.8 mol % silica ($SiO_2$), 30.1 mol % alumina ($Al_2O_3$), 10.7 mol % soda ($Na_2O$), 4.4 mol % magnesia (MgO), 24.3 mol % quicklime (CaO), and 3.7 mol % zirconia ($ZrO_2$), both glasses disclosed among others in U.S. Application No. 63/575,880 filed Apr. 8, 2024, which is incorporated by reference herein in its entirety.

Such aluminate glasses may have a temperatures at which the glasses have viscosity of $10^{14.68}$ poise that are greater than 600° C., such as greater than 650° C., such as greater than 675° C., such as greater than 700° C. (e.g., 700.3° C. and 699.7° C. respectively for the first and second examples just provided). Such aluminate glasses may have elastic modulus greater than 80 GPa, such as greater than 90 GPa, such as greater than 100 GPa (e.g., 99.9 GPa and 102.3 GPa respectively for the first and second examples just provided).

Such aluminate glasses may be chemically tempered in a salt bath as disclosed herein, with mixed nitrate and sulfate salts of potassium and sodium, such as 25.6 wt % sodium nitrate, 47.6 wt % potassium nitrate, 9.2 wt % sodium sulfate, and 17.6 wt % potassium sulfate, to impart a surface compressive stress offset by a central tension. When soaked for 4 hours in such a molten salt bath at 600° C., the aluminate glass examples exhibited a central tension, the first at 2.4 MPa and the second at 1.5 MPa for example. When soaked for 9 hours, both exhibited increased central tensions, the first at 6.2 MPa and the second at 6.5 MPa. Also, both glasses exhibited measurable weight gain, 0.06% and 0.02% respectively following the 9 hour soaks.

According to an aspect and as disclosed above, such aluminate glasses with quicklime may comprise a reduced amount of calcium near surfaces thereof compared to centers thereof, as well as robust stress profiles, having a greater concentration of compressive stress extending into the respective glasses than may be present for profiles that decrease linearly, as described above.

Construction and arrangements of the compositions, assemblies, and structures, as shown in the various aspects, are illustrative only. Although only a few examples of the aspects have been described in detail in this disclosure, modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. The order or sequence of any process, logical algorithm, or method steps may be varied or re-sequenced according to alternative embodiments. Other substitutions, modifications, changes and omissions may also be made in the design, operating conditions and arrangement of the various aspects without departing from the scope of the present inventive technology.

What is claimed is:

1. A strengthened glass article, comprising:

glass in terms of oxides on a mol % basis comprising:

greater than 17 mol % and less than 65 mol % alumina; and a sum of lithia and soda greater than 5 mol % and less than 16 mol %;

and a sum of yttria, quicklime, and magnesia greater than 15 mol % and less than 70 mol %;

wherein the glass has a strain point temperature of at least 700° C. corresponding to glass viscosity of $10^{14.68}$ poise; and wherein the strengthened glass article comprises a positive central tension.

2. The strengthened glass article of claim 1, wherein the glass comprises at least 5 mol % quicklime, and wherein a surface of the strengthened glass article has less calcium than an interior portion of the strengthened glass article.

3. The strengthened glass article of claim 1, further comprising a region of compressive stress with a profile where magnitude of compressive stress decreases with respect to depth, wherein the region of compressive stress extends over a distance of depth (A), which is greater than 20 μm and bounded by a depth of compression where stress in the strengthened glass article transitions to tension, and wherein the profile has a peak compressive stress (B) that is greater than 100 MPa, where the profile is such that an integral of the compressive stress over the distance is greater than a product of (½)AB.

4. The strengthened glass article of claim 3, further comprising a spike in compressive stress at a surface, and wherein the peak compressive stress B is a knee stress of the profile and the distance A is also bounded by the spike such that the distance A is a change in depth between an interior end of the spike and the depth of compression, and wherein an integral of compressive stress over the distance A is at least 15% greater than a product of (½)AB.

5. The strengthened glass article of claim 1, wherein the strain point temperature is at least 700° C., and wherein the glass has an elastic modulus greater than 100 GPa.

6. A strengthened glass article, comprising:

surfaces facing away from one another and a center positioned equidistantly therebetween; and glass of the glass article extending between the surfaces and through the center, wherein the glass has a strain point temperature greater than 600° C. corresponding to glass viscosity of $10^{14.68}$ poise, wherein the glass article has a greater mol % of soda at the center than at the surfaces, and a lesser mol % of quicklime at the surfaces than at the center; and a region of compressive stress with a profile where magnitude of compressive stress decreases non-linearly with depth, wherein the region of compressive stress extends over a distance of depth (A), which is greater than 20 μm and bounded by a depth of compression where stress in the glass article transitions to tension, and wherein the region has a peak compressive stress (B) that is greater than 100 MPa, where the region is such that an integral of the compressive stress over the distance is at least 15% greater than a product of (½) AB.

7. The strengthened glass article of claim 6, further comprising a spike of compressive stress with a magnitude exceeding 500 MPa, and wherein the stress (B) is a knee stress of the profile and the distance (A) is also bounded by the spike such that the distance (A) is a change in depth between an interior end of the spike and the depth of compression.

8. The strengthened glass article of claim 6, wherein the glass is aluminosilicate glass comprising soda and quicklime constituents.

9. The strengthened glass article of claim 6, wherein the glass is alumina rich such that the glass comprises greater than 15 mol % alumina.

10. The strengthened glass article of claim 9, wherein the glass is also rich in alkaline earth metal oxides such that the glass comprises greater than 4 mol % of alkaline earth metal oxides, but less than 15 mol % alkaline earth metal oxides.

11. The strengthened glass article of claim 10, wherein the alkaline earth metal oxides comprise greater than 0.1 mol % of both quicklime and magnesia.

12. The strengthened glass article of claim 11, further comprising greater than 8 mol % to less than 25 mol % alkali metal oxides.

13. The strengthened glass article of claim 12, wherein lithia of the alkali metal oxides is less than 5 mol % of the glass.

14. A strengthened glass article, comprising:

a silicate glass comprising soda and quicklime, wherein the silicate glass is alumina rich such that the glass also comprises greater than 17 mol % alumina;

a surface portion of the silicate glass in compression; and an internal portion within the silicate glass in tension;

wherein the silicate glass has a greater mol % of soda at the internal portion than at the surface portion, and a lesser mol % of quicklime at the surface portion than at the internal portion.

15. The strengthened glass article of claim 14, wherein the silicate glass comprises greater than 4 mol % alkaline earth metal oxides.

16. The strengthened glass article of claim 15, wherein the silicate glass further comprises greater than 8 mol % to less than 20 mol % alkali metal oxides, and wherein lithia is less than 5 mol % of the silicate glass.

17. A strengthened glass article, comprising:

glass in terms of oxides on a mol % basis comprising:

greater than 17 mol % and less than 65 mol % alumina;

a sum of lithia and soda greater than 5 mol % and less than 16 mol %; and a sum of alumina, yttria, quicklime, and magnesia greater than 40 mol %;

wherein the glass has a strain point temperature of at least 700° C. corresponding to glass viscosity of $10^{14.68}$ poise; and wherein the strengthened glass article comprises a positive central tension.

18. The strengthened glass article of claim 17, wherein the glass comprises at least 5 mol % quicklime, and wherein a surface of the strengthened glass article has less calcium than an interior portion of the strengthened glass article.

* * * * *